(12) United States Patent
Waldron et al.

(10) Patent No.: US 10,217,375 B2
(45) Date of Patent: *Feb. 26, 2019

(54) VIRTUAL BEHAVIOR TRAINING USING AUGMENTED REALITY USER DEVICES

(71) Applicant: BANK OF AMERICA CORPORATION, Charlotte, NC (US)

(72) Inventors: Willard H. Waldron, Charlotte, NC (US); Victoria L. Dravneek, Charlotte, NC (US); Joseph N. Johansen, Rock Hill, SC (US); Darryl C. Goebel, Cary, NC (US)

(73) Assignee: Bank of America Corporation, Charlotte, NC (US)

( * ) Notice: Subject to any disclaimer, the term of this patent is extended or adjusted under 35 U.S.C. 154(b) by 2 days.

This patent is subject to a terminal disclaimer.

(21) Appl. No.: 15/377,795

(22) Filed: Dec. 13, 2016

(65) Prior Publication Data

US 2018/0165984 A1 Jun. 14, 2018

(51) Int. Cl.
*G09B 19/00* (2006.01)
*G06T 11/00* (2006.01)
(Continued)

(52) U.S. Cl.
CPC ............... *G09B 19/00* (2013.01); *G06F 3/14* (2013.01); *G06T 11/00* (2013.01); *G09B 5/02* (2013.01);
(Continued)

(58) Field of Classification Search
CPC .............................. G06T 19/006; G06T 19/20
(Continued)

(56) References Cited

U.S. PATENT DOCUMENTS 5,999,944 A 12/1999 Lipkin
6,408,257 B1 6/2002 Harrington et al.
(Continued)

FOREIGN PATENT DOCUMENTS

CN 103635920 A 3/2014

OTHER PUBLICATIONS

Saettler, M., "Westpac integrates augmented reality into bank account management," http://www.mobilecommercedaily.com/westpac-integrates-augmented-reality-into-bank-account-management, Aug. 6, 2014, 8 pages.

(Continued)

*Primary Examiner* — Javid A Amini
(74) *Attorney, Agent, or Firm* — Michael A. Springs

(57) ABSTRACT

An augmented reality system that includes an augmented reality user device. The augmented reality user device includes display for overlaying virtual objects onto tangible objects in a real scene and a memory storing scenarios for a user. The augmented reality user device includes a processor implementing a virtual assessment engine and a virtual overlay engine. The virtual assessment engine identifies a user identifier for the user and executes a scenario for the user. The virtual assessment engine identifies actions performed by the user related to the scenario. The virtual assessment engine sends a token with the user identifier and user action information to a remote server and receives information for the user from the server. The virtual overlay engine presents the information as virtual objects overlaid with the real scene.

20 Claims, 8 Drawing Sheets

US 10,217,375 B2
Page 2

(51) Int. Cl.
*G06F 3/14* (2006.01)
*H04L 29/08* (2006.01)
*G09B 5/02* (2006.01)
*H04L 29/06* (2006.01)
*G06F 3/01* (2006.01)

(52) U.S. Cl.
CPC .............. *H04L 63/08* (2013.01); *H04L 67/12* (2013.01); *G06F 3/017* (2013.01); *G06F 2221/2111* (2013.01)

(58) Field of Classification Search
USPC ........................................................ 345/633
See application file for complete search history.

(56) References Cited

U.S. PATENT DOCUMENTS

| | | | |
|---|---|---|---|
| 6,602,075 B2 | 8/2003 | Adams | |
| 6,602,076 B2 | 8/2003 | Adams | |
| 6,625,299 B1 | 9/2003 | Meisner et al. | |
| 6,871,140 B1 | 3/2005 | Florance et al. | |
| 6,941,001 B1 | 9/2005 | Bolle et al. | |
| 7,099,850 B1 | 8/2006 | Mann, II et al. | |
| 7,392,208 B2 | 6/2008 | Morse et al. | |
| 7,680,694 B2 | 3/2010 | Glazer et al. | |
| 7,817,104 B2 | 10/2010 | Ryu et al. | |
| 7,831,471 B2 | 11/2010 | Adams | |
| 7,834,883 B2 | 11/2010 | Adams | |
| 7,899,750 B1* | 3/2011 | Klieman | G06Q 20/102 705/35 |
| 8,069,095 B2 | 11/2011 | Glazer et al. | |
| 8,165,924 B2 | 4/2012 | Smyers et al. | |
| 8,285,638 B2 | 10/2012 | Jung et al. | |
| 8,326,704 B2 | 12/2012 | Glazer et al. | |
| 8,396,738 B1 | 3/2013 | Allan et al. | |
| 8,417,625 B2 | 4/2013 | Bannerjee et al. | |
| 8,433,650 B1 | 4/2013 | Thomas | |
| 8,438,001 B2 | 5/2013 | Natarajan et al. | |
| 8,438,110 B2 | 5/2013 | Calman et al. | |
| 8,442,295 B2 | 5/2013 | Sam | |
| 8,442,906 B1 | 5/2013 | Thomas | |
| 8,451,266 B2 | 5/2013 | Hertenstein | |
| 8,577,803 B2 | 11/2013 | Chatterjee et al. | |
| 8,589,255 B2 | 11/2013 | Glazer et al. | |
| 8,601,386 B2 | 12/2013 | Altberg et al. | |
| 8,611,601 B2 | 12/2013 | Calman et al. | |
| 8,612,363 B2 | 12/2013 | Karkanias et al. | |
| 8,635,104 B2 | 1/2014 | Adams | |
| 8,639,622 B1* | 1/2014 | Moore | G06Q 20/405 705/35 |
| 8,645,220 B2* | 2/2014 | Harper | G06F 3/011 705/14.1 |
| 8,660,951 B2 | 2/2014 | Calman et al. | |
| 8,688,594 B2 | 4/2014 | Thomas et al. | |
| 8,718,612 B2 | 5/2014 | Calman et al. | |
| 8,743,145 B1 | 6/2014 | Price | |
| 8,803,916 B1* | 8/2014 | Paczkowski | G06T 11/60 345/629 |
| 8,805,739 B2 | 8/2014 | Brown et al. | |
| 8,810,599 B1 | 8/2014 | Tseng | |
| 8,890,896 B1 | 11/2014 | Tseng | |
| 8,929,591 B2 | 1/2015 | Calman et al. | |
| 8,990,914 B2 | 3/2015 | Da Cruz Pinto et al. | |
| 9,007,473 B1 | 4/2015 | Worley, III et al. | |
| 9,026,486 B2 | 5/2015 | Doorhy et al. | |
| 9,044,673 B1 | 6/2015 | Ahuja et al. | |
| 9,047,636 B2 | 6/2015 | Ross | |
| 9,066,200 B1 | 6/2015 | Loxam et al. | |
| 9,082,149 B2 | 7/2015 | Argue et al. | |
| 9,092,600 B2 | 7/2015 | Scavezze et al. | |
| 9,092,898 B1 | 7/2015 | Fraccaroli et al. | |
| 9,100,493 B1 | 8/2015 | Zhou et al. | |
| 9,105,013 B2 | 8/2015 | Chavez | |
| 9,111,383 B2 | 8/2015 | Fein et al. | |
| 9,153,074 B2 | 10/2015 | Zhou et al. | |
| 9,223,950 B2 | 12/2015 | Li et al. | |
| 9,230,367 B2 | 1/2016 | Stroila | |
| 9,251,504 B2 | 2/2016 | Chavez | |
| 9,317,860 B2 | 4/2016 | Calman et al. | |
| 9,331,969 B2 | 5/2016 | Barak et al. | |
| 9,338,589 B2 | 5/2016 | Loxam et al. | |
| 9,342,928 B2 | 5/2016 | Rasane et al. | |
| 9,349,118 B2 | 5/2016 | Chavez | |
| 9,355,123 B2 | 5/2016 | Wnuk et al. | |
| 9,367,878 B2 | 6/2016 | Rao | |
| 9,846,965 B2* | 12/2017 | Mitchell | G06T 19/006 |
| 2002/0044152 A1 | 4/2002 | Abbott, III et al. | |
| 2007/0100749 A1* | 5/2007 | Bachu | G06Q 20/108 705/42 |
| 2008/0070689 A1* | 3/2008 | Van Luchene | G07F 17/32 463/42 |
| 2010/0063914 A1* | 3/2010 | Lozano | G06Q 40/00 705/35 |
| 2010/0238161 A1 | 9/2010 | Varga et al. | |
| 2011/0134108 A1 | 6/2011 | Hertenstein | |
| 2011/0141254 A1* | 6/2011 | Roebke | G06F 17/30041 348/61 |
| 2012/0019557 A1* | 1/2012 | Aronsson | G06T 11/00 345/633 |
| 2012/0156668 A1 | 6/2012 | Zelin | |
| 2012/0232966 A1 | 9/2012 | Calman et al. | |
| 2012/0232968 A1* | 9/2012 | Calman | G06Q 30/0207 705/14.4 |
| 2012/0232976 A1 | 9/2012 | Calman et al. | |
| 2012/0232977 A1 | 9/2012 | Calman et al. | |
| 2012/0310826 A1* | 12/2012 | Chatterjee | G06Q 20/36 705/41 |
| 2013/0097060 A1* | 4/2013 | Taylor | G06Q 40/00 705/35 |
| 2013/0166332 A1 | 6/2013 | Hammad | |
| 2013/0226682 A1 | 8/2013 | Grossman | |
| 2014/0012746 A1* | 1/2014 | Hanson | G06Q 40/00 705/40 |
| 2014/0040127 A1 | 2/2014 | Chatterjee et al. | |
| 2014/0067712 A1 | 3/2014 | Prasad et al. | |
| 2014/0076965 A1* | 3/2014 | Becorest | G06Q 20/342 235/380 |
| 2014/0100994 A1 | 4/2014 | Tatzel et al. | |
| 2014/0114832 A1* | 4/2014 | Escott | G06Q 40/04 705/37 |
| 2014/0172559 A1 | 6/2014 | Calman et al. | |
| 2014/0181678 A1 | 6/2014 | Louchheim et al. | |
| 2014/0247278 A1* | 9/2014 | Samara | G06T 11/00 345/633 |
| 2014/0279426 A1 | 9/2014 | Holman et al. | |
| 2014/0289607 A1* | 9/2014 | Ko | G06F 17/30873 715/234 |
| 2014/0330511 A1 | 11/2014 | Tison et al. | |
| 2014/0337175 A1 | 11/2014 | Katzin et al. | |
| 2014/0379468 A1 | 12/2014 | Ganesh et al. | |
| 2015/0012426 A1* | 1/2015 | Purves | G06Q 30/0623 705/41 |
| 2015/0040074 A1* | 2/2015 | Hofmann | G06T 19/006 715/852 |
| 2015/0046284 A1 | 2/2015 | Hart | |
| 2015/0058229 A1 | 2/2015 | Wiacek et al. | |
| 2015/0066722 A1 | 3/2015 | Calman et al. | |
| 2015/0073907 A1* | 3/2015 | Purves | G06Q 20/32 705/14.58 |
| 2015/0082203 A1 | 3/2015 | James et al. | |
| 2015/0109337 A1* | 4/2015 | Hofmann | G06T 7/0002 345/633 |
| 2015/0154446 A1 | 6/2015 | Masood et al. | |
| 2015/0186984 A1 | 7/2015 | Loganathan | |
| 2015/0206218 A1 | 7/2015 | Banerjee et al. | |
| 2015/0221151 A1 | 8/2015 | Bacco et al. | |
| 2015/0229750 A1 | 8/2015 | Zhou et al. | |
| 2015/0254510 A1 | 9/2015 | McKinnon et al. | |
| 2015/0294322 A1* | 10/2015 | Grigg | G06Q 30/0201 705/7.29 |
| 2015/0302027 A1 | 10/2015 | Wnuk et al. | |
| 2015/0324562 A1 | 11/2015 | Scavezze et al. | |
| 2015/0339468 A1 | 11/2015 | Son et al. | |

(56) References Cited

U.S. PATENT DOCUMENTS

| | | | |
|---|---|---|---|
| 2015/0348329 A1 | 12/2015 | Carre et al. | |
| 2015/0363761 A1 | 12/2015 | Grigg et al. | |
| 2015/0363764 A1 | 12/2015 | Grigg et al. | |
| 2016/0049095 A1 | 2/2016 | Yannier et al. | |
| 2016/0063484 A1* | 3/2016 | Carpenter | G06Q 20/354 |
| | | | 705/41 |
| 2016/0063517 A1 | 3/2016 | Sorensen | |
| 2016/0078449 A1* | 3/2016 | Banerjee | G06Q 30/016 |
| | | | 705/304 |
| 2016/0098936 A1 | 4/2016 | Solomon | |
| 2016/0171767 A1 | 6/2016 | Anderson | |
| 2016/0188861 A1 | 6/2016 | Todeschini | |
| 2016/0189426 A1 | 6/2016 | Thomas et al. | |
| 2016/0206960 A1 | 7/2016 | Allen et al. | |
| 2016/0210784 A1 | 7/2016 | Ramsby et al. | |
| 2016/0210790 A1* | 7/2016 | Rasane | G06T 19/006 |
| 2016/0217623 A1 | 7/2016 | Singh | |
| 2017/0076277 A1* | 3/2017 | Zhou | G06Q 20/322 |
| 2017/0228704 A1* | 8/2017 | Zhou | G06Q 20/065 |

OTHER PUBLICATIONS

Dolan, H. et al., "Facilitating Digital Data Transfers Using Augmented Reality Display Devices," U.S. Appl. No. 15/353,005, filed Nov. 16, 2016, 50 pages.

Johansen, J. N. et al., "Real World Gamification Using Augmented Reality User Devices ," U.S. Appl. No. 15/377,690, filed Dec. 13, 2016, 70 pages.

Adams, A. J. et al., "Virtual Reality Dynamic Authentication," U.S. Appl. No. 15/367,590, filed Dec. 2, 2016, 58 pages.

Lee, J. et al., "Contextual Augmented Reality Overlays," U.S. Appl. No. 15/363,388, filed Nov. 29, 2016, 50 pages.

Waldron, W. H. et al., "Virtual Assessments Using Augmented Reality User Devices," U.S. Appl. No. 15/364,927, filed Nov. 30, 2016, 85 pages.

Votaw, E. S. et al., "Remote Document Execution and Network Transfer Using Augmented Reality Display Devices," U.S. Appl. No. 15/353,370, filed Nov. 16, 2016, 42 pages.

Dolan, H. et al., "Augmented Reality Headset and Digital Wallet," U.S. Appl. No. 15/363,692, filed Nov. 29, 2016, 41 pages.

Johansen, J. N., "Facilitating Dynamic Across-Network Location Determination Using Augmented Reality Display Devices," U.S. Appl. No. 15/372,909, filed Dec. 8, 2016, 44 pages.

Ogrinz, M. et al., "Facilitating Network Security Analysis Using Virtual Reality Display Devices." U.S. Appl. No. 15/367,896, filed Dec. 2, 2016, 44 pages.

Dintenfass, K., "Property Assessments Using Augmented Reality User Devices," U.S. Appl. No. 15/367,435, filed Dec. 2, 2016, 81 pages.

Wadley, C. D. et al., "Facilitating Across-Network, Multi-User Sessions Using Augmented Reality Display Devices," U.S. Appl. No. 15/397,086, filed Jan. 3, 2017, 49 pages.

Dintenfass, K., "Geo-targeted Property Analysis Using Augmented Reality User Devices," U.S. Appl. No. 15/367,554, filed Dec. 2, 2016, 80 pages.

Adams, A. J. et al., "Augmented Reality Dynamic Authentication for Electronic Transactions," U.S. Appl. No. 15/367,551, filed Dec. 2, 2016, 57 pages.

Lee, J., "Facilitating Digital Data Transfers Using Virtual Reality Display Devices," U.S. Appl. No. 15/363,185, filed Nov. 29, 2016, 52 pages.

Dintenfass, K., "Real Estate Property Project Analysis Using Augmented Reality User Devices," U.S. Appl. No. 15/367,822, filed Dec. 2, 2016, 81 pages.

Adams, A. J. et al., "Augmented Reality Dynamic Authentication," U.S. Appl. No. 15/367,502, filed Dec. 2, 2016, 57 pages.

Dolan, H. et al., "User Authentication and Authorization for Electronic Transaction," U.S. Appl. No. 15/363,495, filed Nov. 29, 2016, 41 pages.

Waldron, W. H. et al., "Geolocation Notifications Using Augmented Reality User Devices," U.S. Appl. No. 15/365,272, filed Nov. 30, 2016, 85 pages.

Waldron, W. H. et al., "Object Recognition and Analysis Using Augmented Reality User Devices," U.S. Appl. No. 15/365,511, filed Nov. 30, 2016, 86 pages.

Wadley, C. D. et al., "Facilitating Across-Network Handoffs for Devices Using Augmented Reality Display Devices," U.S. Appl. No. 15/397,031, filed Jan. 3, 2017, 49 pages.

Wadley, C. D. et al., "Facilitating Across-Network Handoffs for an Assistant Using Augmented Reality Display Devices," U.S. Appl. No. 15/397,125, filed Jan. 3, 2017, 48 pages.

Johansen, J. N., "Facilitating Dynamic Across-Network Location Determination Using Augmented Reality Display Devices," U.S. Appl. No. 15/372,964, filed Dec. 8, 2016, 43 pages.

* cited by examiner

VIRTUAL BEHAVIOR TRAINING USING AUGMENTED REALITY USER DEVICES

TECHNICAL FIELD

The present disclosure relates generally to performing operations using an augmented reality display device that overlays graphic objects with objects in a real scene.

BACKGROUND

Existing systems use two-dimensional graphical user interfaces to display information to a user. Using conventional two-dimensional graphical user interfaces to display information creates several technical problems and limitations that are inherent to existing display technology. For example, existing two-dimensional graphical user interfaces limit the amount of information the person can see based on the size of the display. In addition, the person may have to interact with multiple windows or screens on the graphical user interface to view all information in which the person is interested. Using existing graphical user interfaces and having to interact with multiple windows or screens causes a disconnect between the information being presented and a real world environment. It is desirable to provide the ability to reduce the disconnect between the information being presented and a real world environment.

SUMMARY

In one embodiment, the disclosure includes an augmented reality system with an augmented reality user device for a user. The augmented reality user device has a display for overlaying virtual objects onto tangible objects in a real scene in real-time. The augmented reality user device also has a memory that stores scenarios for a user. The augmented reality user device further includes one or more processors connected to the display and the memory.

The processors implement a virtual assessment engine and a virtual overlay engine. The virtual assessment engine authenticates the user based on a user input and identifies a user identifier for the user in response to successfully authenticating the user. The virtual assessment engine executes a scenario from the plurality of scenarios for the user. The virtual assessment engine identifies one or more user actions performed by the user and determines whether the user actions are related to the scenario.

The virtual assessment engine generates user action information which identifies the user actions and the scenario when the user actions are related to the scenario. The virtual assessment engine generates a token that includes the user identifier and the user action information and sends the token to a remote server. In response to sending the token to the remote server, the virtual assessment engine receives virtual assessment data including virtual account information and account information for the user. The virtual overlay engine presents the virtual assessment data as virtual objects overlaid with a real scene.

The augmented reality system further includes the remote server that includes an augmented reality engine. The augmented reality engine identifies the virtual account information and the account information for the user based on the user identifier. The augmented reality engine modifies the virtual account information based on the user action information. The augmented reality engine generates the virtual assessment data that includes the modified virtual account information and the account information for the user and sends the virtual assessment data to the augmented reality user device.

In one embodiment, an augmented reality user device allows a user to employ concept modules and scenarios while simultaneously monitoring the actions of the user in the real world. The augmented reality user device uses the concept modules and scenarios to educate the user about how certain actions and behavior impact the user. The concept modules and scenarios provide information about actions or behaviors a user can perform to improve their current knowledge, skill sets, and/or behavior The augmented reality user device monitors and analyzes the user's actions and determines whether the user is performing actions that are related to the concept module or scenario the user is interacting with. This allows the augmented reality user device to automatically identify and verify when the user has performed actions identified by the concept module or scenario.

The augmented reality user device collects information about actions performed by the user that are related to a concept module or scenario and updates virtual account information and/or account information for the user based on the collected information. For example, when the user makes responsible decisions or completes tasks identified by a scenario, the augmented reality user device rewards the user by crediting the user's virtual account and/or other accounts. As another example, when the user makes poor decisions or does not complete tasks identified by a scenario, the augmented reality user device may penalize the user's virtual account and/or other accounts.

The augmented reality user device receives modified virtual account information and/or account information for the user from a remote server. The augmented reality user device presents the modified virtual account information and/or account information to the user as one or more virtual objects overlaid with tangible object in the real scene in front of the user. The augmented reality user device allows the user to see impact of their actions in the context of their actions in the real world in real-time. For example, the user can see how certain behavior or actions either positively or negatively affect their virtual accounts and other accounts.

In another embodiment, the augmented reality user device allows a user to visualize their projected account information. The augmented reality user device aggregates account information for the user such as account balances. The augmented reality user device aggregates information about the user's habits. The user's habits may be determined based on account information such as transaction history and payment history. The augmented reality user device presents the projected account information as virtual objects overlaid with tangible object in the real scene in front of the user. In one embodiment, the augmented reality user device presents the projected account information as virtual objects representing of physical objects. For example, the augmented reality user device presents virtual objects that illustrates a particular lifestyle that corresponds with the user's account information. In another example, the augmented reality user device allows the user to specify future account goals and the visualize their goals. The augmented reality user device allows the user visualize how their decisions and behavior impacts their future and projected account balances. For example, the augmented reality user device allows the user to visualize how making certain decisions such as saving or investing results in an improved outcome for the user. The augmented reality user device uses visual outcomes to help educate the user about how particular types of behavior and actions impact the user and their future goals.

Conventional systems only provide raw number-based data about a user's accounts such as account balances. In contrast to conventional systems, the augmented reality user device provides an unconventional solution that allows the user to visualize the raw data as virtual objects that correspond with physical objects that can easily be interpreted by the user.

The present embodiment presents several technical advantages. A technical advantage is the augmented reality user device allows a user view information as virtual or graphical object overlaid onto the physical object in real-time. Using the augmented reality user device, the user is able to view vast amount of information in the context of the real scene in front of the user. The augmented reality user device presents the received information to the user as one or more virtual objects overlaid with tangible object in the real scene in front of the user. The augmented reality user device allows the user to see impact of their actions in the context of their actions in the real world in real-time. In contrast to typical systems, the augmented reality user device also allows the user to visualize the raw data (e.g. number-based data) as virtual objects that correspond with physical objects that can easily be interpreted by the user.

The augmented reality user device generates tokens based on the identity of a user and user actions which improves the performance of the augmented reality user device by reducing the amount of information used to make a data request. Tokens are encoded or encrypted to obfuscate and mask information being communicated across a network. Masking the information being communicated protects users and their information in the event of unauthorized access to the network and/or data occurs.

The augmented reality user device uses object recognition and optical character recognition to identify objects the user is looking at or interacting with. Retrieving information about the objects the user is interacting with using object recognition and optical character recognition allows the augmented reality user device to reduce the amount of time required to collect data compared to existing systems that rely on the user to manually enter all of the information for a request. This process for autonomously collecting information for the data request also reduces the likelihood of user input errors and improves the reliability of the system.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
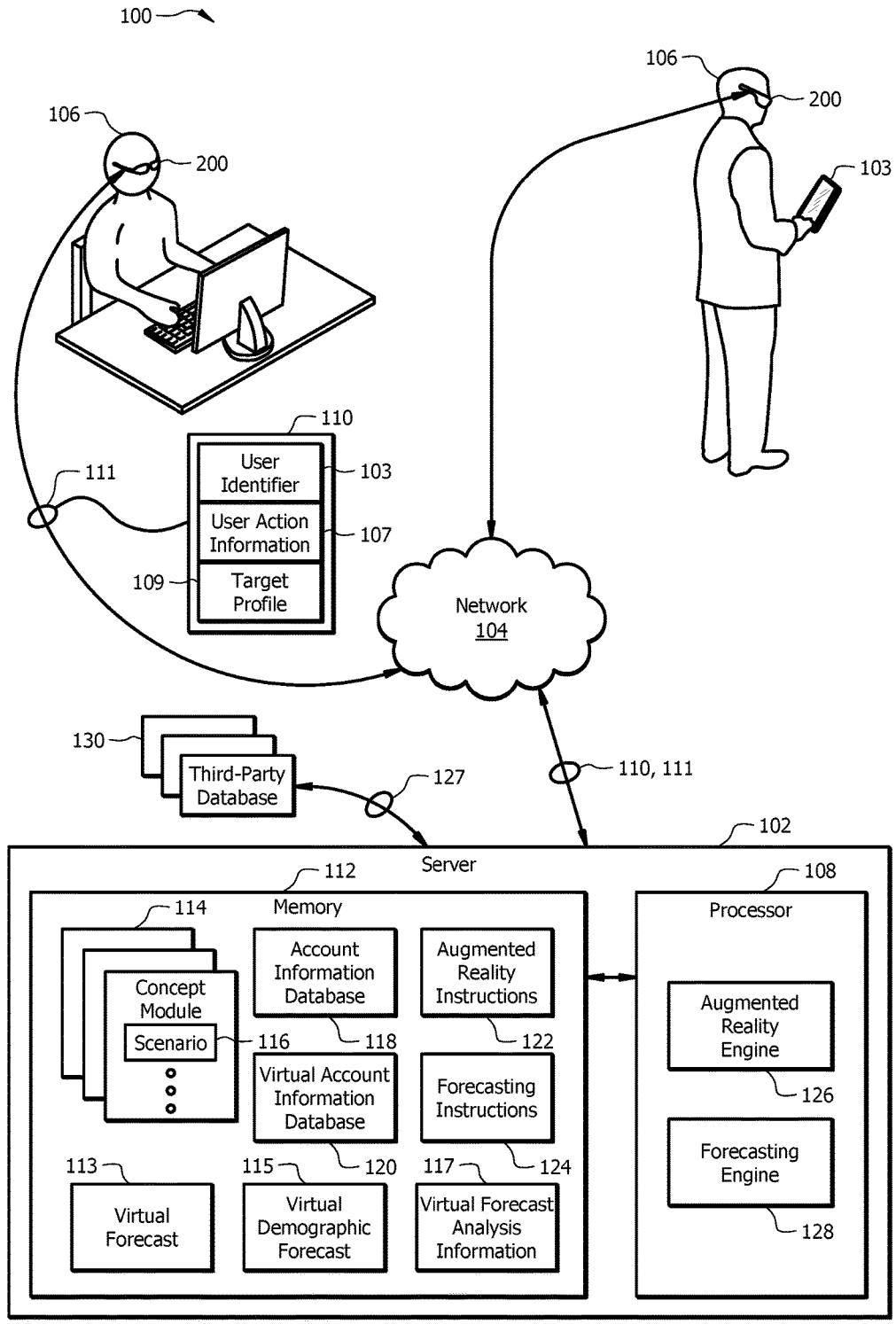
FIG. 1 is a schematic diagram of an embodiment of an augmented reality system configured to overlay virtual objects with a real scene.

Existing system use two-dimensional graphical user interfaces to display information to a user. Using conventional two-dimensional graphical user interfaces to display information creates several technical problem and limitations that are inherent to existing display technology. For example, existing two-dimensional graphical user interfaces limit the amount of information the person can see based on the size of the display. In addition, the person may have to interact with multiple windows or screens on the graphical user interface in order to view all of the information the person is interested in. Using existing graphical user interfaces and having to interact with multiple windows or screens causes a disconnect between the information being present and a real world environment.

An augmented reality user device allows a user view information as virtual or graphical object overlaid onto the physical object in real-time. Using the augmented reality user device, the user is able to view vast amounts of information in the context of the real scene in front of the user. The augmented reality user device presents the received information to the user as one or more virtual objects overlaid with tangible object in the real scene in front of the user. The augmented reality user device allows the user to see impact of their actions in the context of their actions in the real world in real-time. In contrast to conventional systems, the augmented reality user device also allows the user to visualize the raw data (e.g. number-based data) as virtual objects that correspond with physical objects that can easily be interpreted by the user. The augmented reality user device provides an unconventional solution by first translating raw data into virtual object representations of physical objects and then presenting the virtual objects in the context of the real scene in front of the user. This unconventional solution allows the user visualize raw data without having to analyze or understand the raw data.

Another technical challenge of conventional systems occurs when person wants to access information from multiple sources. For example, the person may want to look up their personal information which is distributed among different databases with different sources and results in several technical problems. Using conventional systems, the person has to make individual data requests to each of the different sources in order to obtain the desired information. This process involves making numerous data requests to different data sources which uses a significant amount of processing resources to generate the data requests. Typically, processing resources are limited and the system is unable to perform other tasks when processing resources are occupied which degrades the performance of the system. The process of sending numerous data requests and receiving information from multiple sources occupies network resources until all of the information has been collected. This process poses a burden on the network which degrades the performance of the network.

Additionally, each data request may use different credentials to authenticate the person with each of the different sources. Providing different credentials to each source increases the complexity of the system and increases the amount of data that is sent across the network. The increased complexity of the system makes existing systems difficult to manage. The additional data that is sent across the network both occupies additional network resources and exposes additional sensitive information to network.

The augmented reality user device provides an unconventional technical solution that allows a user to reduce the number of data requests used to obtain information from multiple sources. The augmented reality user device leverages image processing to extract information for a data request. The augmented reality user device allows the user to authenticate themselves to obtain information that allows the user to request and obtain personal information that is specific to the user with the same data request. The number of processing resources used to generate the reduced number of data requests is less than the number of processing resources used by existing systems to generate the numerous data requests. The overall performance of the system is improved as a result of consuming less processing resources. Using a reduced number of data requests to obtain information from multiple sources reduces the amount of data traffic used to obtain the information which results in improved network utilization and network performance.

Securely transferring data and information across a network poses several technical challenges. Networks are susceptible to attacks by unauthorized users trying to gain access to sensitive information being communicated across the network. Unauthorized access to a network may compromise the security of the data and information being communicated across the network.

The augmented reality user device provides a technical solution for improving network security by generating and using tokens for requesting potentially sensitive information. The augmented reality user device allows tokens to be generated automatically upon identifying and extracting information from the scene in front of the user. The token may be encoded or encrypted to obfuscate the information being communicated by it. Using tokens to mask information that is communicated across the network protects users and their information in the event of unauthorized access to the network and/or data occurs. The tokens also allow for data transfers to be executed using less information than other existing systems, and thereby reduces the amount of data that is communicated across the network. Reducing the amount of data that is communicated across the network improves the performance of the network by reducing the amount of time network resource are occupied.

The augmented reality user device uses object recognition and optical character recognition of images to quickly retrieve information for generating tokens. The augmented reality user device allows information for generating tokens to be retrieved based on images of real scene which significantly reduces the amount of time required to make a data request compared to existing systems that rely on the user to manually enter all of the information for the request. Using object recognition and optical character recognition to identify and retrieve information also allows the augmented reality user device to be less dependent on user input, which reduces the likelihood of user input errors and improves reliability of the system.

Figure 2:
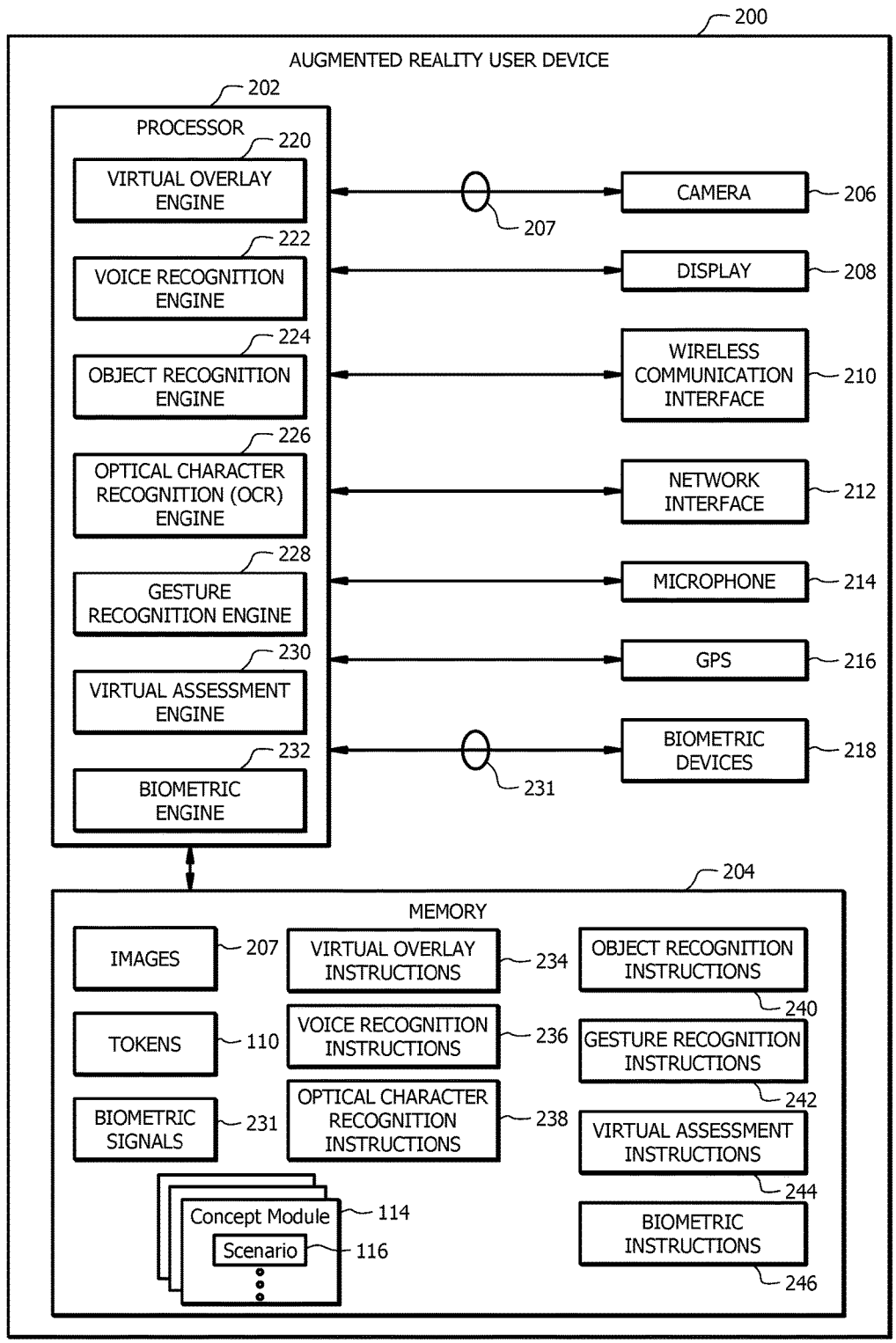
FIG. 2 is a schematic diagram of an embodiment of an augmented reality user device employed by the augmented reality system.
Figure 3:
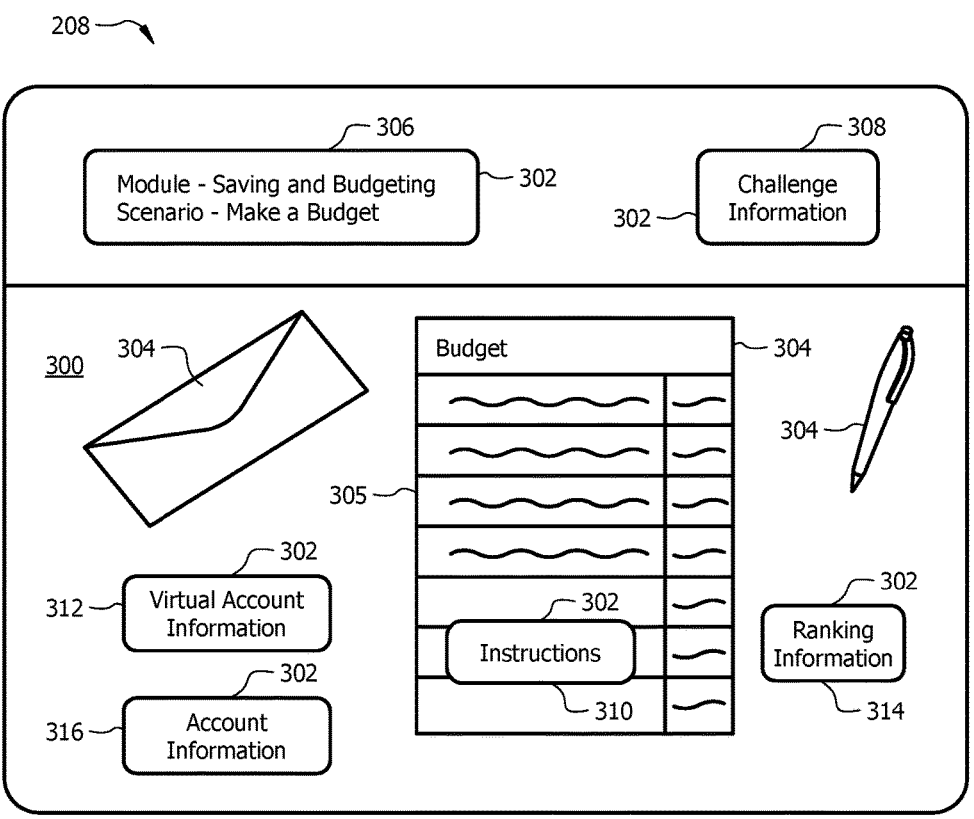
FIG. 3 is an embodiment of a first person view from a display of an augmented reality user device overlaying virtual objects with a real scene.
Figure 4:
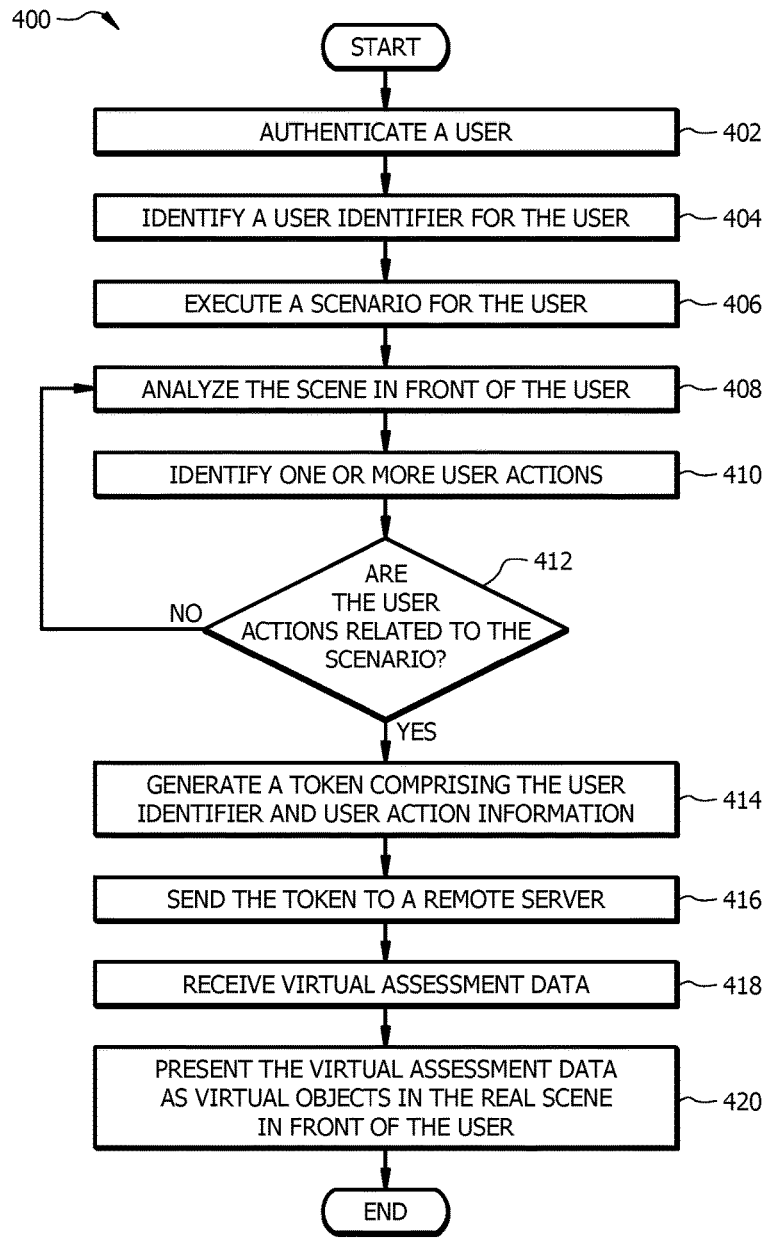
FIG. 4 is a flowchart of an embodiment of an augmented reality overlaying method for an augmented reality user device.
Figure 5:
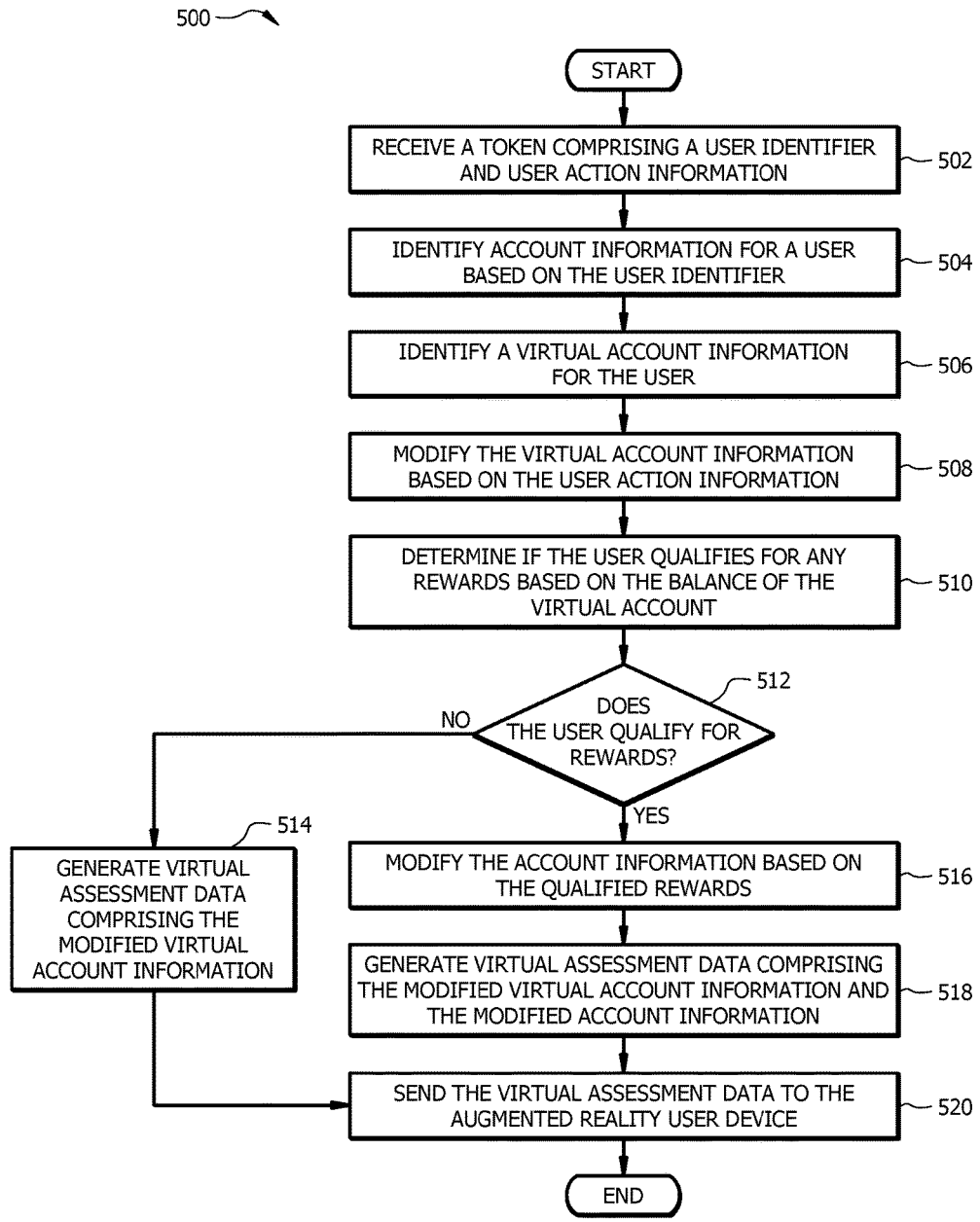
FIG. 5 is a flowchart of an embodiment of an augmented reality overlaying method for a server.
Figure 6:
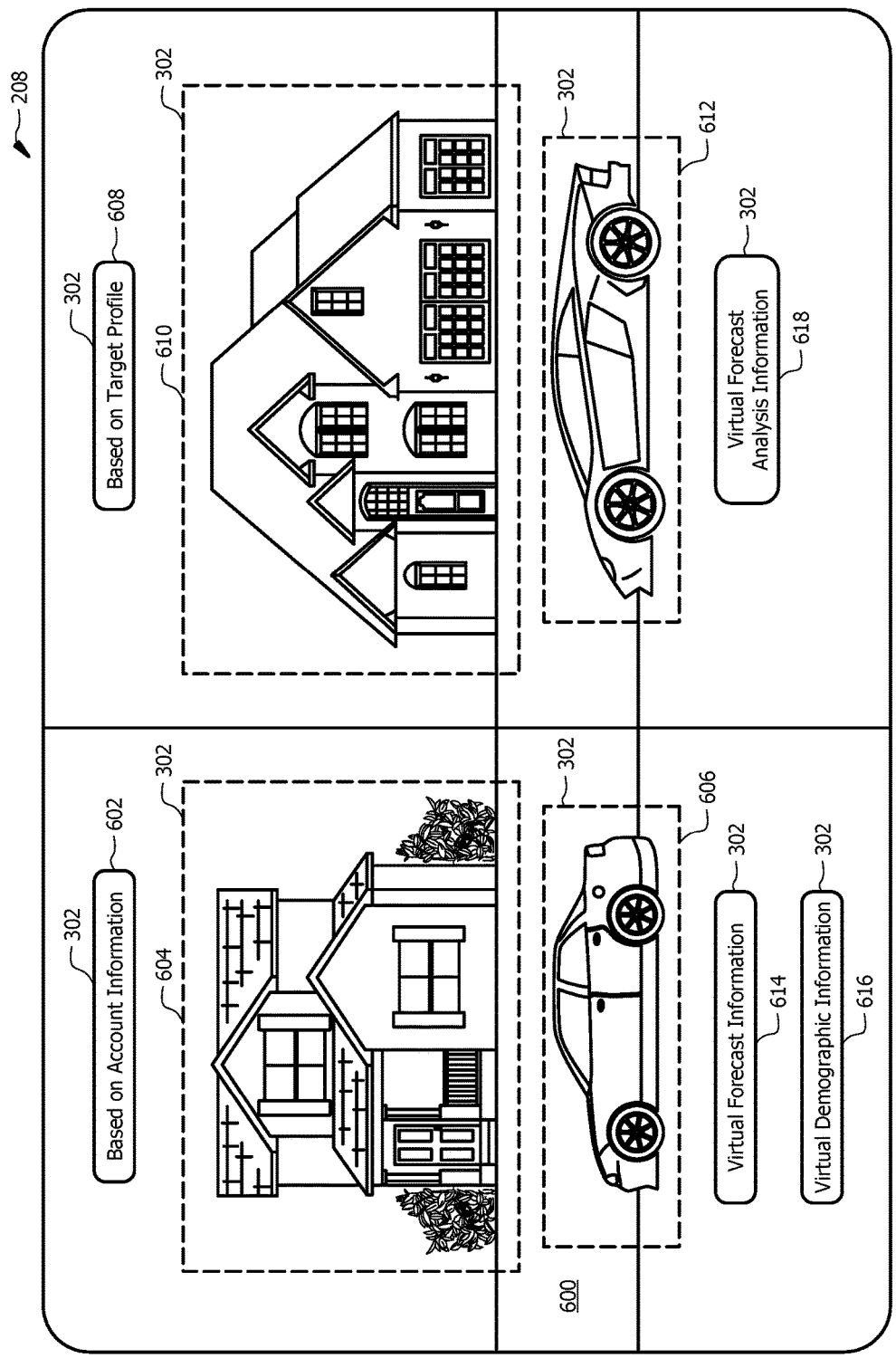
FIG. 6 is another embodiment of a first person view from a display of an augmented reality user device overlaying virtual objects with a real scene.
Figure 7:
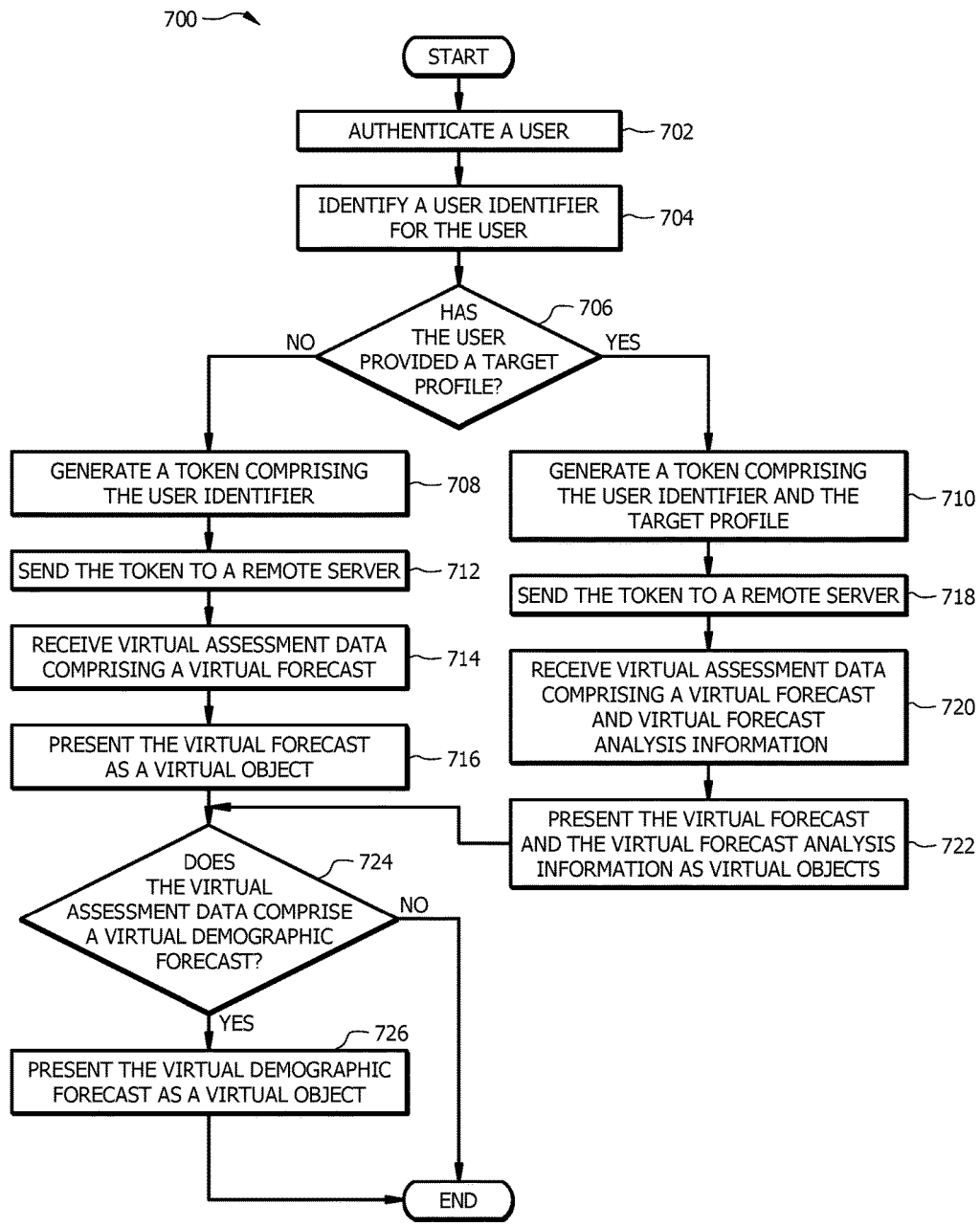
FIG. 7 is a flowchart of an embodiment of an augmented reality overlaying method for an augmented reality user device.
Figure 8:
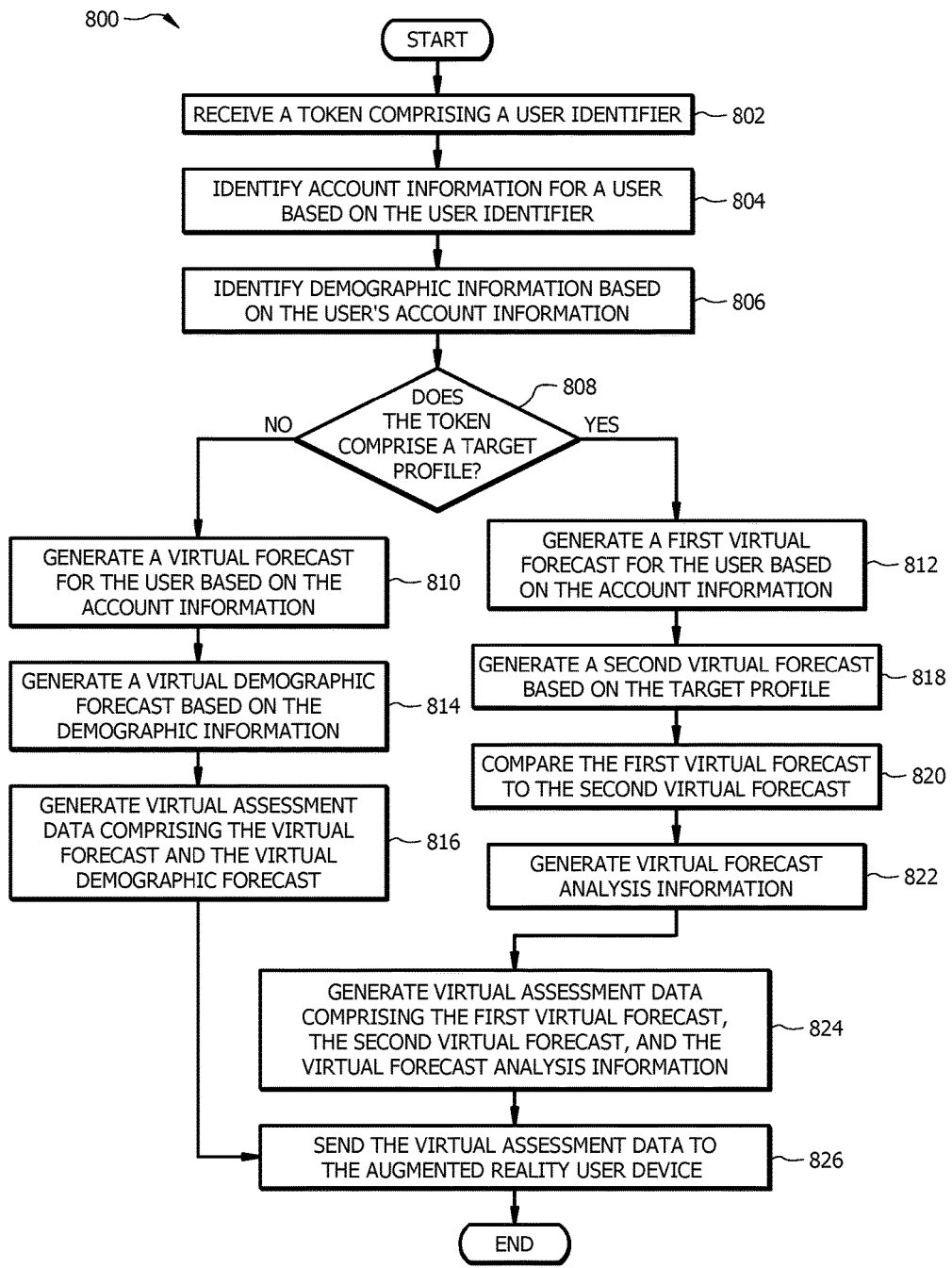
FIG. 8 is a flowchart of another embodiment of an augmented reality overlaying method for a server.

FIG. 1 illustrates an example of users employing augmented reality user devices to view virtual objects overlaid with tangible objects in a real scene in front of the users. FIG. 2 is an embodiment of how an augmented reality user device may be configured and implemented. FIGS. 3 and 6 provide examples of a first person view of what a user might see when using the augmented reality user device to view virtual objects overlaid with tangible objects. FIGS. 4 and 7 are examples of a process for facilitating augmented reality overlays with tangible objects using an augmented reality user device. FIGS. 5 and 8 are examples of a process for facilitating augmented reality overlays with tangible objects with a remote server.

FIG. 1 is a schematic diagram of an embodiment of an augmented reality system 100 configured to overlay virtual objects with a real scene. The augmented reality system 100 comprises an augmented reality user device 200 in signal communication with a remote server 102 via a network 104. The augmented reality user device 200 is configured to employ any suitable connection to communicate data with the remote server 102. In FIG. 1, the augmented reality user device 200 is configured as a head-mounted wearable device. Other examples of wearable devices are integrated into a contact lens structure, an eye glass structure, a visor structure, a helmet structure, or any other suitable structure. In some embodiments, the augmented reality user device 200 may be integrated with a mobile user device 103. Examples of mobile user devices 103 include, but are not limited to, a mobile phone, a computer, a tablet computer, and a laptop computer. For example, the user 106 may use a smart phone as the augmented reality user device 200 to overlay virtual objects with a real scene. Additional details about the augmented reality user device 200 are described in FIG. 2.

In one embodiment, the augmented reality user device 200 is configured to operate in two modes of operation. In the first mode of operation, the augmented reality user device 200 is configured to allow a user 106 to monitor the actions of the user 106 in the real world while using concept modules 114 and scenarios 116. The augmented reality user device 200 uses the concept modules 114 and scenarios 116 to educate the user 106 about how certain actions and behavior impact the user 106. For example, the augmented reality user device 200 may present concept modules 114 and scenarios 116 about various financial literacy topics to educate the user 106 about specific actions that positively or negatively impact the user's accounts and financial health. In other examples, the augmented reality user device 200 uses the concept modules 114 and scenarios 116 to educate the user 106 about any other topics and/or the impact of any other actions or types of behavior.

The augmented reality user device 200 is configured to monitor and analyze the user's 106 actions in the context of a concept module 114 and scenario 116. In other words, the augmented reality user device 200 monitors for actions that are related to concepts or skills being taught by a concept module 114 and scenario 116. The augmented reality user device 200 is configured to collect information about actions performed by the user 106 while executing a concept module 114 or scenario 116 and to update virtual account information and/or account information for the user 106 based on the collected information. The collected information about actions performed by the user 106 while executing a concept module 114 or scenario 116 may also be referred to as user action information 107. User action information 107 may further comprise information identify the concept module 114 and/or scenario 116 the user 106 is interacting with.

The augmented reality user device 200 is configured to send the collected information as a token 110 to the remote server 102 to modify the user's 106 virtual account information and/or account information. Modifications to the user's 106 virtual account information may trigger a modification to the user's 106 account information, and vice-versa. For example, the user's 106 account information may be modified to reflect the user 106 receiving various rewards, offers, or credits in response to the user 106 increasing their virtual account balance. The augmented reality user device 200 is configured to receive virtual assessment data 111 from the remote server 102 that comprises information for the user 106. The augmented reality user device is configured to present the received information to the user 106 as one or more virtual objects overlaid with tangible object in the real scene in front of the user 106. The augmented reality user device 200 allows the user 106 to see impact of their actions in the context of their actions in the real world in real-time. Examples of the augmented reality user device 200 using concept modules 114 and scenarios 116 while monitoring the actions of the user 106 in the real world are described in FIGS. 3 and 4.

In one embodiment, multiple users 106 are connected to the remote server 102 via their respective augmented reality user devices 200. Information from each of the augmented reality user devices 200 is collected at the remote server 102 and may be used to provide information to a user 106 about how they compare or rank among other users 106 based on their virtual account information and/or account information. Information about how a user 106 compares to other users 106 based on their virtual account information and/or account information may also be referred to as ranking information. For example, gamification may occur when multiple augmented reality user devices 200 are connected the remote server 102. Each user's 106 virtual account information and/or account information may be used as a score for the user 106, which is then used to rank the user 106 among other users 106. In this example, the augmented reality user devices 200 provide a social network that allows user 106 interact and/or compete with each other.

In the second mode of operation, the augmented reality user device 200 is configured to allow the user 106 to visualize raw data for the user 106, for example, projected account information for the user 106. For example, the augmented reality user device 200 is configured to receive a virtual forecast 113 for the user 106 based on aggregated account information for the user 106 and information about the user's 106 habits (e.g. transaction history) from the remote server 102. A virtual forecast 113 is a projected or future state of a user's 106 account. The augmented reality user device 200 is configured to present information related to the received virtual forecast 113 as virtual objects overlaid with tangible object in the real scene in front of the user 106. The augmented reality user device 200 is configured to use the virtual objects to present representations of physical objects that represent a projected state of a user's 106 accounts bases on their current account information and behavior. For instance, the augmented reality user device 200 may be configured to present virtual objects that illustrates a particular lifestyle that corresponds with the user's 106 projected account information. Conventional system only provide raw number-based data about a user's 106 account such as account balances. In contrast to conventional systems, the augmented reality user device 200 allows the user 106 to visualize the raw data as virtual objects that correspond with physical objects that can easily be interpreted by the user 106.

As an example, the augmented reality user device 200 is configured to request a virtual forecast 113 from the remote server 102. The virtual forecast 113 comprises information about a projected state of the user's 106 account based on their current account information, behavior, and habits. For example, the virtual forecast 113 comprises information indicating the projected state of the user's 106 account in ten years based on their current account information and habits. In other examples, the virtual forecast 113 comprises information indicating the projected state of the user's 106 account at any other future time based on their current behavior. The augmented reality user device 200 is configured to use virtual objects to present representations of physical objects that represent the projected state of a user's 106 account.

In another example, the augmented reality user device 200 is configured to generate a target profile 109 that identifies a goal or target state for the user's 106 account. For instance, the target profile 109 may identify retirement account balance and saving account balance goals for the user 106. The augmented reality user device 200 is configured to send a token 110 to request a virtual forecast 113 and/or virtual forecast analysis information 117 based on the user's 106 account information and/or the target profile 109 from the remote server 102. The virtual forecast analysis information 117 comprises information indicating whether the user 106 is projected to achieve their goals based on their current account information and habits. The virtual forecast analysis may also comprise information about particular actions the user 106 can make to achieve their goals, demographic information about the habits of other people who have achieved similar goals, and/or any other information. In one embodiment, the augmented reality user device 200 is configured to use virtual objects to present representations of physical objects that represent the user's 106 goals based on the virtual forecast 112 that is generated based on the target profile 109. Examples of the augmented reality user device 200 visualizing a user's 106 projected account information is described in FIG. 7.

The network 104 comprises a plurality of network nodes configured to communicate data between augmented reality user devices 200 and one or more servers 102 and/or third-party databases 130. Examples of network nodes include, but are not limited to, routers, switches, modems, web clients, and web servers. The network 104 is configured to communicate data (e.g. tokens 110 and virtual assessment data 111) between augmented reality user devices 200 and the server 102. Network 104 is any suitable type of wireless and/or wired network including, but not limited to, all or a portion of the Internet, the public switched telephone network, a cellular network, and a satellite network. The network 104 is configured to support any suitable communication protocols as would be appreciated by one of ordinary skill in the art upon viewing this disclosure.

The server 102 is linked to or associated with one or more institutions. Examples of institutions include, but are not limited to, organizations, businesses, government agencies, financial institutions, and universities, among other examples. The server 102 is a network device comprising one or more processors 108 operably coupled to a memory 112. The one or more processors 108 are implemented as one or more central processing unit (CPU) chips, logic units, cores (e.g. a multi-core processor), field-programmable gate array (FPGAs), application specific integrated circuits (ASICs), or digital signal processors (DSPs). The one or more processors 108 are communicatively coupled to and in signal communication with the memory 112. The one or more processors 108 are configured to process data and may be implemented in hardware or software. The one or more processors 108 are configured to implement various instructions. For example, the one or more processors 108 are configured to implement an augmented reality engine 126 and a forecasting engine 128. In an embodiment, the augmented reality engine 126 and the forecasting engine 128 are implemented using logic units, FPGAs, ASICs, DSPs, or any other suitable hardware.

Examples of the augmented reality engine 126 in operation are described in detail below and in FIGS. 3 and 5. In one embodiment, the augmented reality engine 126 is configured to receive a token 110 and to process the token 110 to identify a user identifier 103 for the user 106, user action information 107, and/or any other information. In one embodiment, processing the token 110 comprises decrypting and/or decoding the token 110 when the token 110 is encrypted or encoded by the augmented reality user device 200. The augmented reality engine 126 employs any suitable decryption or decoding technique as would be appreciated by one of ordinary skill in the art.

The augmented reality engine 126 is configured to use the user identifier 103 to look-up and identify account information for the user 106 in an account information database 118. The account information comprises one or more accounts (e.g. payment accounts), budgeting information, transaction history, membership information (e.g. loyalty or reward program memberships), and/or any other information linked with the user 106. Examples of accounts include, but are not limited to, checking accounts, savings accounts, investment accounts, retirement accounts, credit card accounts, lines of credit, and any other suitable type of account.

The augmented reality engine 126 is configured to identify virtual account information for the user 106. In one embodiment, the augmented reality engine 126 identifies the virtual account information for the user 106 based on the user identifier 103. For example, the augmented reality engine 126 uses the user identifier 103 to look-up the virtual account information and accounts for the user 106 in the virtual account information database 120. In another embodiment, the augmented reality engine 126 identifies the virtual account information for the user 106 based on information provided by the account information for the user 106. For example, the account information comprises information identifying a virtual account for the user 106. In other embodiments, the augmented reality engine 126 identifies the virtual account information for the user 106 based on any other suitable information.

The augmented reality engine 126 is configured to modify virtual account information for a user 106 based on actions performed by the user 106 while interacting with a concept module 114 or a scenario 116. In one embodiment, the augmented reality engine 126 is configured to modify virtual account information for a user 106 based on the user account information 107. For example, the augmented reality engine 126 increases the virtual account balance when the user 106 performs actions that are identified as positively impacting the user's 106 virtual account such as completing a concept module 114, a scenario 116, or a challenge. As another example, the augmented reality engine 126 decreases the virtual account balance when the user 106 performs an action that is identified as negatively impacting the user's 106 virtual account balance. In other examples, the augmented reality engine 126 is configured to modify the virtual account information for a user 106 based on any other suitable criteria.

The augmented reality engine 126 is configured to determine whether there are any rewards available for the user 106 based on the user's 106 virtual account information or any other suitable information. Examples of rewards include, but are not limited to, account credits, discounted interest rates, new accounts, fee waivers, special offers, gift cards, coupons, products, and services. For example, the augmented reality engine 126 identifies rewards available to the user 106 based on the balance of their virtual account. For instance, the user 106 qualifies for a reward when the balance of the virtual account meets or exceeds a predetermined threshold value. As another example, the augmented reality engine 126 identifies that a reward is available for the user 106 based on actions performed by the user 106. For instance, the augmented reality engine 126 compares user actions identified by the user action information 107 to predetermined actions that qualify the user 106 for a reward.

The augmented reality engine 126 is configured to modify a user's 106 account information based on changes to their virtual account information, for example, based on qualified rewards. The augmented reality engine 126 is configured to modify the user's 106 account information to reflect any qualified rewards. For example, the augmented reality engine 126 modifies the user's 106 account information to reflect account credits, discounted interest rates, new accounts, fee waivers, special offers, coupons, services, or any other types of rewards. The augmented reality engine 126 provides real world benefits or rewards to the user 106 based on the user's actions and/or modifications to the user's 106 virtual account.

In one embodiment, the augmented reality engine 126 is configured to send a data request 127 comprising information provided by the token 110, virtual account information for the user 106, and/or account information for the user 106 to one or more third-party databases 130 to query the third-party databases 130 for available rewards for the user 106. For example, a third-party database 130 is linked with a vendor and provides information about available rewards for the user 106 in response to the data request 127. In one embodiment, the data request 127 comprises the user identifier 103, virtual account information for the user 106, account information for the user 106, any other information linked with the user 106, or combinations of information.

The augmented reality engine 126 is configured to generate virtual assessment data 111 that comprises aggregated information (e.g. virtual account information and account information) for the user 106 and to send the aggregated information to the augmented reality user device 200. An example of the augmented reality engine 126 aggregating information to be transmitted as virtual assessment data 111 to the augmented reality user device 200 is described in FIG. 5.

Examples of the forecasting engine 128 in operation are described in detail below and in FIGS. 6 and 8. The forecasting engine 128 is configured to receive and process a token 110 from the augmented reality user device 200. The forecasting engine 128 is configured to decrypt and/or decode the token 110 when the token 110 is encrypted or encoded by the augmented reality user device 200. The forecasting engine 128 employs any suitable decryption or decoding technique as would be appreciated by one of ordinary skill in the art. In one embodiment, the forecasting engine 128 processes the token 110 to identify a user identifier 103. The forecasting engine 128 is configured to use the user identifier 103 to look-up and identify account information for the user 106 in an account information database 118. In other embodiments, the forecasting engine 128 processes the token 110 to identify any other information.

The forecasting engine 128 is configured to generate virtual forecasts 113. Virtual forecasts 113 may be based on a user's 106 account information and/or a target profile 109. For example, the forecasting engine 128 generates a virtual forecast 113 based on projected account balances and/or transaction history for a user 106. In other examples, the forecasting engine 128 generates a virtual forecast 113 based on any other information or combinations of information from the user's 106 account information. As another example, forecasting engine 128 generates a virtual forecast 113 based on information provided by a target profile 109 such as target account balances and/or any other goals for the user 106.

The forecasting engine 128 is configured to compare information from multiple virtual forecasts 113 and to identify any differences between the virtual forecasts 113. For example, the forecasting engine 128 may identify account balance differences, projected lifestyle differences, and/or any other types of differences between a pair of virtual forecasts 113. The forecasting engine 128 is configured to generate virtual forecast analysis information 117 based on a comparison between multiple virtual forecasts 113. The virtual forecast analysis information 117 comprises identified differences between virtual forecasts 113, actions the user 106 can perform to reduce or minimize differences between virtual forecasts 113, and/or any other behavior information.

The forecasting engine 128 is configured to identify demographic information based on a user's 106 account information. For example, the forecasting engine 128 may query the account information database 118 for other people with similar account information. For example, the forecasting engine 128 may identify other people that either previously or currently have similar types of accounts, account balances, and/or spending habits based on their transaction history, and/or any other similar information.

The forecasting engine 128 is configured to generate a virtual demographic forecast 115 based on the demographic information. For example, the forecasting engine 128 generates the virtual demographic forecast 115 based on projected account balances and transaction history for the other identified people. In other embodiments, the forecasting engine 128 is configured to generate the virtual demographic forecast 115 based on any other information from the demographic information.

The forecasting engine 128 is configured to generate virtual assessment data 111 that comprises virtual forecasts 113, virtual demographic forecasts 115, and virtual forecast analysis information 117, and/or any other information for the user 106 and to send the aggregated information to the augmented reality user device 200. An example of the forecasting engine 128 aggregating information to be transmitted as virtual assessment data 111 to the augmented reality user device 200 is described in FIG. 8.

The memory 112 comprises one or more disks, tape drives, or solid-state drives, and may be used as an over-flow data storage device, to store programs when such programs are selected for execution, and to store instructions and data that are read during program execution. The memory 112 may be volatile or non-volatile and may comprise read-only memory (ROM), random-access memory (RAM), ternary content-addressable memory (TCAM), dynamic random-access memory (DRAM), and static random-access memory (SRAM). The memory 112 is operable to store one or more concept modules 114, one or more scenarios 116, virtual forecasts 113, virtual demographic forecasts 115, virtual forecast analysis information 117, an account information database 118, a virtual account information database 120, augmented reality instructions 122, forecasting instructions 124, and/or any other data or instructions. The augmented reality instructions 122 and the forecasting instructions 124 comprise any suitable set of instructions, logic, rules, or code operable to execute the augmented reality engine 126 and the forecasting engine 128, respectively.

A concept module 114 is an educational module that provides information for the user 106 about a particular topic. Concept modules 114 provide theoretical information and/or information about real world skills or actions the user 106 can perform that are related to a particular topic. Concept modules 114 may be related to one or more topics. Examples of topics include, but are not limited to, education, working, chores, behavior training, physical fitness, and financial literacy. For example, concept modules 114 related to financial literacy may comprise a credit module, a saving and budgeting module, a debt module, a home buying and renting module, a taxes module, a car buying module, a personal banking and security module, a paying for school module, a family and money module, a military finances module, a work and income module, a retirement module, and/or any other concept modules.

Each concept module 114 comprises one or more scenarios 116. A scenario 116 is a lesson for a concept module 114. For example, scenarios 116 for a concept module 114 about paying for school may comprise a saving scenario, a loan scenario, a scholarship and grant scenario, a work study scenario, and/or any other scenarios related to the concept module 114. A scenario 116 may comprise one or more lessons and/or challenges for the user 106. Lessons provide information to educate the user 106 about a particular topic. Challenges are actions or tasks the user 106 can perform to reinforce a lesson. Challenges may be intended to educate the user 106 about particular actions or behavior that positively impacts the user 106. In an embodiment, challenges may be associated with a point system that credits the user's 106 virtual account based on the completion of a challenge. For example, a challenge for a scenario 116 about chores may comprise actions such as taking out trash, washing dishes, or sweeping. As another example, a challenge for a scenario 116 about financial literacy may comprise actions such as balancing a checkbook, making a budget, or making a mobile deposit. In other examples, challenges may comprise any other actions related to concept module 114 or scenario 116.

Concept modules 114 and scenarios 116 are linked with one or more virtual accounts for a user 106. A scenario 116 may identify challenges or actions that positively or negatively impact the user's 106 virtual account. For example, actions such as completing a concept module 114, scenario 116, or challenge are actions that positively impacts the user's 106 virtual account. Actions such as failing to complete a concept module 114, scenario 116, or challenge are actions that may negatively impact the user's 106 virtual account. A scenario 116 may define any number of challenges or actions that either positively or negatively impact a user's 106 virtual account.

A virtual forecast 113 is a projected or future state of a user's 106 account. In one embodiment, a virtual forecast 113 is based on projected account balances for a user 106 at some future point in time based on the user's 106 current behavior and habits. A user's 106 behavior and habits may be determined based on transaction history, payment history, or any other account information for the user 106. For example, a user's 106 transaction history may be used to identify the user's 106 spending habits or cash flow. As another example, a user's 106 payment history may be used to identify reoccurring or long-term debts. In other examples, any other information may be user to determine any other types of behavior or habits for the user 106. In another embodiment, a virtual forecast 113 is based on target account balances for the user 106, which may be specified in a target profile 109. Generating a virtual forecast 113 may comprise employing one or more machine learning algorithms, numerical analysis algorithms, data extrapolation, data fitting, model fitting, and/or any other suitable technique as would be appreciated by one of ordinary skill in the art.

Virtual demographic forecasts 115 is a projected or future state of an account based on account information from other people (e.g. demographic information). As an example, a virtual demographic forecast 115 may be based on projected account balances and transaction history for the other people with similar demographic information and/or account information as a user 106. Virtual demographic forecasts 115 may be generated similar to the process described for generating virtual forecasts 113.

In one embodiment, virtual demographic forecasts 115 illustrate different projected account balances for the user 106 based on modifications to their behavior. A virtual demographic forecast 115 may illustrate a more positive or more negative outcome than a virtual forecast 113 for the user 106 based on a modified behavior of the user 106. In other words, a virtual demographic forecast 115 may illustrate different possible outcomes for the user 106 if they modify their current behavior. For example, a virtual demographic forecast 116 may illustrate different types of habits and behavior affect the projected account balances for the user 106.

Virtual forecast analysis information 117 comprises identified differences between virtual forecasts 113, actions the user 106 can perform to reduce or minimize differences between virtual forecasts 113, behavior difference between the user 106 and other people, and/or any other information distinguishing two virtual forecasts 113 or information used to derive virtual forecasts 113.

The account information database 124 comprises account information for one or more users 106. Account information includes, but is not limited to, demographic information, personal information, credit scores, credit history, institution names, account names, account balances, account types, budget information, rewards points, member benefits, transaction history, and payment history.

The virtual account information database 120 comprises virtual account information for one or more users 106. The virtual account information identifies one or more virtual accounts for a user 106. A virtual account may use virtual credits, tokens, coins, or any other kind of digital currency. Virtual accounts are linked with concept modules 114 and scenarios 116. Virtual account balances can be modified in response to actions performed by a user 106 when interacting with a concept module 114 or a scenario 116. In one embodiment, virtual accounts may have one or more predetermined thresholds that may be used for triggering a reward for a user 106. The predetermined thresholds may be set any suitable values.

In an embodiment, the one or more concept modules 114, the one or more scenarios 116, virtual forecasts 113, virtual demographic forecasts 115, virtual forecast analysis information 117, the account information database 118, the virtual account information database 120, the augmented reality instructions 122 and/or the forecasting instructions 124 are stored in a memory external of the server 102. For example, the server 102 is operably coupled to a remote database storing the one or more concept modules 114, the one or more scenarios 116, virtual forecasts 113, virtual demographic forecasts 115, virtual forecast analysis information 117, the account information database 118, the virtual account information database 120, the augmented reality instructions 122 and/or the forecasting instructions 124.

In one embodiment, the server 102 is in signal communication with one or more third-party databases 130. Third-party databases 130 are databases owned or managed by a third-party source. Examples of third-party sources include, but are not limited to, vendors, institutions, and businesses. In one embodiment, the third-party databases 130 are configured to store account information for the user 106, virtual account information for the user 106, demographic information, reward information, real estate information, product information, travel information, and/or any other information. In one embodiment, third-party databases 130 are configured to push (i.e. send) data to the server 102. The third-party database 130 is configured to send information to the server 102 with or without receiving a data request 127 for the information. The third-party database 130 is configured to send data periodically to the server 102, for example, hourly, daily, or weekly. For example, the third-party database 130 is configured to push reward information to the server 102 hourly.

In another embodiment, a third-party database 130 is configured to receive a data request 127 for information from the server 102. The third-party database 130 is configured to send the requested information back to the server 102. For example, a third-party database 130 is configured to receive a data request 127 comprising account information and/or virtual account information for a user 106. The third-party database 130 is configured to use the account information and/or the virtual account information for a user 106 to look-up information for the user 106 within the records of the third-party database 130. In other examples, third-party databases 130 are configured to use any information provided to the server 102 to look-up information for the user 106.

FIG. 2 is a schematic diagram of an embodiment of an augmented reality user device 200 employed by the augmented reality system 100. The augmented reality user device 200 is configured to capture images 207 of objects in front of the user 106 and/or gestures or actions being performed by the user 106, to send a token 110 identifying the user 106 and identified user actions to a remote server 102, to receive virtual assessment data 111 in response to sending the token 110, and to present virtual objects overlaid onto one or more tangible objects in a real scene in front of the user 106 based on the information provided by the virtual assessment data 111. Examples of the augmented reality user device 200 in operation are described in FIGS. 4 and 7.

The augmented reality user device 200 comprises a processor 202, a memory 204, a camera 206, a display 208, a wireless communication interface 210, a network interface 212, a microphone 214, a GPS sensor 216, and one or more biometric devices 218. The augmented reality user device 200 may be configured as shown or in any other suitable configuration. For example, augmented reality user device 200 may comprise one or more additional components and/or one or more shown components may be omitted.

Examples of the camera 206 include, but are not limited to, charge-coupled device (CCD) cameras and complementary metal-oxide semiconductor (CMOS) cameras. The camera 206 is configured to capture images 207 of people, text, and objects within a real environment. The camera 206 is configured to capture images 207 continuously, at predetermined intervals, or on-demand. For example, the camera 206 is configured to receive a command from a user to capture an image 207. In another example, the camera 206 is configured to continuously capture images 207 to form a video stream of images 207. The camera 206 is operable coupled to an object recognition engine 224, an optical character (OCR) recognition engine 226, and/or a gesture recognition engine 228 and provides images 207 to the object recognition engine 224, the OCR recognition engine 226, and/or the gesture recognition engine 228 for processing, for example, to identify gestures, actions, text, and/or objects in front of the user.

The display 208 is configured to present visual information to a user in an augmented reality environment that overlays virtual or graphical objects onto tangible objects in a real scene in real-time. In an embodiment, the display 208 is a wearable optical head-mounted display configured to reflect projected images and allows a user to see through the display 208. For example, the display 208 may comprise display units, lens, semi-transparent mirrors embedded in an eye glass structure, a contact lens structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matric OLED (AMOLED), an organic LED (OLED) display, a projector display, or any other suitable type of display as would be appreciated by one of ordinary skill in the art upon viewing this disclosure. In another embodiment, the display 208 is a graphical display on a user device. For example, the graphical display may be the display of a tablet or smart phone configured to display an augmented reality environment with virtual or graphical objects overlaid onto tangible objects in a real scene in real-time.

Examples of the wireless communication interface 210 include, but are not limited to, a Bluetooth interface, a radio frequency identifier (RFID) interface, a near-field communication (NFC) interface, a local area network (LAN) interface, a personal area network (PAN) interface, a wide area network (WAN) interface, a Wi-Fi interface, a ZigBee interface, or any other suitable wireless communication interface as would be appreciated by one of ordinary skill in the art upon viewing this disclosure. The wireless communication interface 210 is configured to allow the processor 202 to communicate with other devices. For example, the wireless communication interface 210 is configured to allow the processor 202 to send and receive signals with other devices for the user (e.g. a mobile phone) and/or with devices for other people. The wireless communication interface 210 is configured to employ any suitable communication protocol.

The network interface 212 is configured to enable wired and/or wireless communications and to communicate data through a network, system, and/or domain. For example, the network interface 212 is configured for communication with a modem, a switch, a router, a bridge, a server, or a client. The processor 202 is configured to receive data using network interface 212 from a network or a remote source.

Microphone 214 is configured to capture audio signals (e.g. voice commands) from a user and/or other people near the user. The microphone 214 is configured to capture audio signals continuously, at predetermined intervals, or on-demand. The microphone 214 is operably coupled to the voice recognition engine 222 and provides captured audio signals to the voice recognition engine 222 for processing, for example, to identify a voice command from the user.

The GPS sensor 216 is configured to capture and to provide geographical location information. For example, the GPS sensor 216 is configured to provide the geographic location of a user employing the augmented reality user device 200. The GPS sensor 216 is configured to provide the geographic location information as a relative geographic location or an absolute geographic location. The GPS sensor 216 provides the geographic location information using geographic coordinates (i.e. longitude and latitude) or any other suitable coordinate system.

Examples of biometric devices 218 include, but are not limited to, retina scanners and finger print scanners. Biometric devices 218 are configured to capture information about a person's physical characteristics and to output a biometric signal 231 based on captured information. A biometric signal 231 is a signal that is uniquely linked to a person based on their physical characteristics. For example, a biometric device 218 may be configured to perform a retinal scan of the user's eye and to generate a biometric signal 231 for the user based on the retinal scan. As another example, a biometric device 218 is configured to perform a fingerprint scan of the user's finger and to generate a biometric signal 231 for the user based on the fingerprint scan. The biometric signal 231 is used by a biometric engine 232 to identify and/or authenticate a person.

The processor 202 is implemented as one or more CPU chips, logic units, cores (e.g. a multi-core processor), FPGAs, ASICs, or DSPs. The processor 202 is communicatively coupled to and in signal communication with the memory 204, the camera 206, the display 208, the wireless communication interface 210, the network interface 212, the microphone 214, the GPS sensor 216, and the biometric devices 218. The processor 202 is configured to receive and transmit electrical signals among one or more of the memory 204, the camera 206, the display 208, the wireless communication interface 210, the network interface 212, the microphone 214, the GPS sensor 216, and the biometric devices 218. The electrical signals are used to send and receive data and/or to control or communicate with other devices. For example, the processor 202 transmits electrical signals to operate the camera 206. The processor 202 may be operably coupled to one or more other devices (not shown).

The processor 202 is configured to process data and may be implemented in hardware or software. The processor 202 is configured to implement various instructions. For example, the processor 202 is configured to implement a virtual overlay engine 220, a voice recognition engine 222, an object recognition engine 224, an OCR recognition engine 226, a gesture recognition engine 228, a virtual assessment engine 230, and a biometric engine 232. In an embodiment, the virtual overlay engine 220, the voice recognition engine 222, the object recognition engine 224, the OCR recognition engine 226, the gesture recognition engine 228, the virtual assessment engine 230, and the biometric engine 232 are implemented using logic units, FPGAs, ASICs, DSPs, or any other suitable hardware.

The virtual overlay engine 220 is configured to overlay virtual objects onto tangible objects in a real scene using the display 208. For example, the display 208 may be head-mounted display that allows a user to simultaneously view tangible objects in a real scene and virtual objects. The virtual overlay engine 220 is configured to process data to be presented to a user as an augmented reality virtual object on the display 208. The virtual overlay engine 220 is configured to translate raw data (e.g. numeric data) into virtual objects (e.g. representations of physical objects). In one embodiment, the virtual overlay engine 220 is configured to map or associate number-based data to virtual objects corresponding with representations of tangible objects. In other embodiments, the virtual overlay engine 200 employs any other suitable technique for translating raw data to virtual objects corresponding with representations of tangible objects. Examples of overlaying virtual objects onto tangible objects in a real scene is shown in FIGS. 3 and 6.

The voice recognition engine 222 is configured to capture and/or identify voice patterns using the microphone 214. For example, the voice recognition engine 222 is configured to capture a voice signal from a person and to compare the captured voice signal to known voice patterns or commands to identify the person and/or commands provided by the person. For instance, the voice recognition engine 222 is configured to receive a voice signal to authenticate a user and/or to identify a selected option or an action indicated by the user.

The object recognition engine 224 is configured to identify objects, object features, branding, text, and/or logos using images 207 or video streams created from a series of images 207. In one embodiment, the object recognition engine 224 is configured to identify objects and/or text within an image 207 captured by the camera 206. In another embodiment, the object recognition engine 224 is configured to identify objects and/or text in about real-time on a video stream captured by the camera 206 when the camera 206 is configured to continuously capture images 207. The object recognition engine 224 employs any suitable technique for implementing object and/or text recognition as would be appreciated by one of ordinary skill in the art upon viewing this disclosure.

The OCR recognition engine 226 is configured to identify objects, object features, text, and/or logos using images 207 or video streams created from a series of images 207. In one embodiment, the OCR recognition engine 226 is configured to identify objects and/or text within an image 207 captured by the camera 206. In another embodiment, the OCR recognition engine 226 is configured to identify objects and/or text in about real-time on a video stream captured by the camera 206 when the camera 206 is configured to continuously capture images 207. The OCR recognition engine 226 employs any suitable technique for implementing object and/or text recognition as would be appreciated by one of ordinary skill in the art upon viewing this disclosure.

The gesture recognition engine 228 is configured to identify gestures or actions performed by a user and/or other people. Examples of gestures include, but are not limited to, hand movements, hand positions, finger movements, head movements, eye movements, and/or any other actions that provide a visual signal from a person. For example, gesture recognition engine 228 is configured to identify hand gestures provided by a user to indicate various commands such as a command to initiate a request for an augmented reality overlay for an object. The gesture recognition engine 228 employs any suitable technique for implementing gesture recognition as would be appreciated by one of ordinary skill in the art upon viewing this disclosure.

The virtual assessment engine 230 is configured to identify and authenticate a user 106 and to provide a user identifier 103 that identifies the user 106. The user identifier 103 is a label or descriptor (e.g. a name based on alphanumeric characters) used to identify the user 106. In one embodiment, the virtual assessment engine 230 is configured to generate the user identifier 103. For example, the user identifier 103 may be randomly generated. In another embodiment, the virtual assessment engine 230 is configured to look-up a user identifier 103 from a user identifier database that is stored in memory 204.

The virtual assessment engine 230 is configured to execute a concept module 114 and/or scenario 116. In one embodiment, the augmented user device 200 is configured to communicate with the remote server 102 to access and execute a concept module 114 and scenario 116 for the user 106. The virtual assessment engine 230 exchanges messages with the remote server 102 to provide access or to download the concept module 114 and scenario 116 identified by the user 106. In another embodiment, concept modules 114 and scenarios 116 are stored locally in the memory 204. The virtual assessment engine 230 executes the concept module 114 and scenario 116 identified by the user 106.

The virtual assessment engine 230 is configured to identify tangible objects in front of the user 106. For example, the virtual assessment engine 230 is configured to identify objects the user is interacting with. The virtual assessment engine 230 is configured to use object recognition and/or optical character recognition to identify objects. In one embodiment, the virtual assessment engine 230 is configured to capture an image 207 of an object and to perform object recognition and/or optical character recognition on the image 207 of the object to identify the object. The virtual assessment engine 230 is configured to identify an object based on the size, shape, color, texture, material, and/or any other characteristics of the object.

The virtual assessment engine 230 is configured to identify actions performed by a user that are related to a scenario 116. The virtual assessment engine 230 is configured to perform text recognition and/or object recognition to identify tangible objects in the scene in front of the user 106 and to perform gesture recognition to identify actions and gestures being performed by the user 106. The augmented reality user device 200 is configured to determine how the user 106 is interacting with the identified objects in the scene in front of the user 106. In one embodiment, the augmented reality user device 200 compares the user's gestures and action with stored known user actions to classify the user's actions or to associate the user's actions with a known stored action. The augmented reality user device 200 is further configured to compare the actions performed by the user 106 with the user actions identified by a scenario 116. In one embodiment, the augmented reality user device 200 determines the actions performed by the user 106 are related to the scenario 116 when the actions substantially match, for example, when the actions are the same.

In one embodiment, the virtual assessment engine 230 is configured to identify the location of the user 106 based on the geographic location of the user 106. For example, the virtual assessment engine 230 uses geographic location information provided by the GPS sensor 216 with a map database to determine the location of the user 106. In another embodiment, the virtual assessment engine 230 is configured to use object recognition and/or optical character recognition to identify the location of the user 106. For example, the virtual assessment engine 230 is configured to identify the location of the user 106 based on the identification of buildings, structures, landmarks, signs, and/or any other types of objects around the user 106. In another embodiment, the virtual assessment engine 230 identifies the location of the user 106 and the property 150 based on a user input, for example, a voice command, a gesture, an input from a user interface. In other embodiments, the virtual assessment engine 230 is configured to determine the location of the user 106 based on any other information and/or using any other suitable technique as would be appreciated by one of ordinary skill in the art.

The virtual assessment engine 230 is configured to generate a target profile 109. The virtual assessment engine 230 is configured to receive information from the user 106 to generate a target profile 109. For example, the virtual assessment engine 230 receives information for the target profile 109 from the user 106 as voice commands, gestures, interactions with a physical component (e.g. a button, knob, or slider) of the augmented reality user device 200, or via any other suitable technique or mechanism.

The virtual assessment engine 230 is configured to generate a token 110 for requesting information for the user 106. The token 110 comprises a user identifier 103, user action information 107, a target profile 109, any other information, or combination of information. The virtual assessment engine 230 is further configured to encrypt and/or encode the token 110. Encrypting and encoding the token 110 obfuscates and mask information being communicated by the token 110. Masking the information being communicated protects users and their information in the event of unauthorized access to the network and/or data occurs. The virtual assessment engine 230 employs any suitable encryption or encoding technique as would be appreciated by one of ordinary skill in the art.

The virtual assessment engine 230 is configured to send the token 110 to a remote server 102 as a data request to initiate the process of obtaining information for the user 106. The virtual assessment engine 230 is further configured to provide the information (e.g. virtual overlay data 111) received from the remote server 102 to the virtual overlay engine 220 to present the information as one or more virtual objects overlaid with tangible objects in a real scene. Examples of employing the virtual assessment engine 230 to request information and present the information to a user 106 is described in FIGS. 4 and 7.

The biometric engine 232 is configured to identify a person based on a biometric signal 231 generated from the person's physical characteristics. The biometric engine 232 employs one or more biometric devices 218 to identify a user based on one or more biometric signals 218. For example, the biometric engine 232 receives a biometric signal 231 from the biometric device 218 in response to a retinal scan of the user's eye and/or a fingerprint scan of the user's finger. The biometric engine 232 compares biometric signals 231 from the biometric device 218 to previously stored biometric signals 231 for the user to authenticate the user. The biometric engine 232 authenticates the user when the biometric signals 231 from the biometric devices 218 substantially matches (e.g. is the same as) the previously stored biometric signals 231 for the user.

The memory 204 comprise one or more disks, tape drives, or solid-state drives, and may be used as an over-flow data storage device, to store programs when such programs are selected for execution, and to store instructions and data that are read during program execution. The memory 204 may be volatile or non-volatile and may comprise ROM, RAM, TCAM, DRAM, and SRAM. The memory 204 is operable to store images 207, tokens 110, biometric signals 231, virtual overlay instructions 234, voice recognition instructions 236, OCR recognition instructions 238, object recognition instructions 240, gesture recognition instructions 242, virtual assessment instructions 244, biometric instructions 246, and any other data or instructions.

Images 207 comprises images captured by the camera 206 and images from other sources. In one embodiment, images 207 comprise images used by the augmented reality user device 200 when performing object recognition and/or optical character recognition. Images 207 can be captured using camera 206 or downloaded from another source such as a flash memory device or a remote server via an Internet connection.

Biometric signals 231 are signals or data that is generated by a biometric device 218 based on a person's physical characteristics. Biometric signals 231 are used by the augmented reality user device 200 to identify and/or authenticate an augmented reality user device 200 user by comparing biometric signals 231 captured by the biometric devices 218 with previously stored biometric signals 231.

Tokens 110 are generated by the virtual assessment engine 230 and sent to a remote server 102 to initiate the process of aggregating information for a user 106. Tokens 110 comprise any suitable information for requesting information from the remote server 102 and/or one or more other sources (e.g. third-party databases 130). In one embodiment, a token 110 is a message or a data request comprising a user identifier 103, user action information 107, a target profile 109, any other information, or combinations of information. Examples of the augmented reality user device 200 generating and sending tokens 110 to initiate a process for obtaining information are described in FIGS. 4 and 7.

The virtual overlay instructions 234, the voice recognition instructions 236, the OCR recognition instructions 238, the object recognition engine 240, the gesture recognition instructions 242, the virtual assessment instructions 244, and the biometric instructions 246 each comprise any suitable set of instructions, logic, rules, or code operable to execute the virtual overlay engine 220, the voice recognition engine 222, the OCR recognition engine 226, the object recognition engine 224, the gesture recognition engine 228, the virtual assessment engine 230, and the biometric engine 232, respectively.

In one embodiment, the memory 204 comprises one or more concepts modules 114 and scenarios 116. The concept modules 114 and scenarios 116 are configured similar to the concept modules 114 and scenarios 116 described in FIG. 1.

FIGS. 3-5 provide examples of how the augmented reality system 100 may operate when a user 106 is performing various actions in the real world and while executing concept modules 114 and scenarios 116. The following is a non-limiting example of how the augmented reality user system 100 may operate. In this example, the user 106 is executing a concept module 114 and scenario 116 related to working. For example, the user 106 is a teenager that is interested in learning about how to make money by working. The user 106 authenticates themselves before using the augmented reality user device 200 by providing credentials (e.g. a log-in and password) and/or a biometric signal. The augmented reality user device 200 authenticates the user 106 based on the user's input and allows the user to generate and send tokens 110. The augmented reality user device 200 identifies the user 106 and a user identifier 103 for the user 106 upon authenticating the user 106. Once the user 106 has been authenticated, the user identifier 103 is used by other systems and devices (e.g. remote server 102 and/or a third-party database 130) to identify and authenticate the user 106 without requiring the user 106 to provide additional credentials for each system.

In this example, the concept module 114 may include a scenario 116 that comprises lessons and challenges for the user 106. For instance, the augmented reality user device 200 presents a scenario 116 to the user 106 that identifies one or more chores the user 106 can perform to earn virtual credits. The augmented reality user device 200 present information about the scenario 116 and challenges to the user 106 using one or more virtual objects overlaid with the real scene in front of the user 106. The augmented reality user device 200 identifies objects in front of the user 106 and actions performed by the user 106 with identified objects to determined whether the user 106 is performing actions that are related to the scenario 116 challenges. For example, the augmented reality user device 200 may determine that the user 106 is performing chores corresponding with the challenges identified by the scenario 116.

The augmented reality user device 200 generates a token 110 and sends the token 110 to the remote server 102. In one embodiment, the augmented reality user device 200 generates a token 110 comprising the user identifier 103 and user action information 107. The user action information 107 comprises information about the concept module 114 and/or scenario 116 the user 106 is working on and the actions performed by the user 106 that are related to the scenario 116. In other embodiments, the augmented reality user device 200 generates a token 110 comprising any other suitable information or combinations of information. For example, the token 110 may comprise information about the geographic location of the user 106 while performing the actions related to the scenario 116. The augmented reality user device 200 encrypts and/or encodes the token 110 prior to sending the token 110 to the remote server 102.

The server 102 receives the token 110 and processes the token 110 to identify the user identifier 103 and the user action information 107. The server 102 decrypts or decodes the token 110 when the token 110 is encrypted or encoded by the augmented reality user device 200. The server 102 uses the user identifier 103 to look-up account information for the user 106 in the account information database 118. The server 102 uses the user identifier 103 and/or the account information for the user 106 to identify virtual account information for the user 106. The server 102 modifies the virtual account information (e.g. a virtual account balance) based on the user action information 107. For example, the server 102 may increase the virtual account balance when the user 106 performs actions that are identified as positively impacting the user's 106 virtual account such as completing a challenge. The server 102 may decrease the virtual account balance when the user 106 fails to complete a challenge or performs an action that is identified as negatively impacting the user's 106 virtual account balance.

In one embodiment, the server 102 determines whether the user 106 qualifies for any rewards, promotions, credits, or tangible gifts based on the balance of the virtual account. In other words, the user 106 may receive a reward that can be used in the real world based on their virtual account. For example, when the user 106 exceeds a predetermined virtual account balance threshold the user 106 may qualify for a reward that impacts or modifies their account information. Examples of rewards include, but are not limited to, account credits, discounted interest rates, new accounts, fee waivers, special offers, gift cards, coupons, products, and services. The server 102 modifies the user's 106 account information when the server 102 determines the user 106 qualifies for a reward.

The server 102 generates virtual assessment data 111 that comprises concept module information, scenario information, challenge information, instructions, the modified virtual account information, modified account information, ranking information, any other information, or combinations of information. The server 102 sends the virtual assessment data 111 to the augmented reality user device 200.

The augmented reality user device 200 receives the virtual assessment data 111 and processes the virtual assessment data 111 to access the information provided by the server 102. The augmented reality user device 200 presents the received information as virtual objects overlaid with tangible objects in the real scene in front of the user 106. The user 106 may use the information presented by the augmented reality user device 200 to quickly identify their account information, virtual account information, and/or any other information in the context of the scene in front of the user 106. An example of the augmented reality user device 200 presenting information to the user 106 as virtual objects overlaid with tangible objects in a real scene in front of the user 106 is described in FIG. 3.

FIG. 3 is an embodiment of a first person view from a display 208 of an augmented reality user device 200 overlaying virtual objects 302 with tangible object 304 within a real scene 300. Examples of tangible objects 304 include, but are not limited to, people, furniture, floors, walls, documents, or any other physical objects. Virtual objects 302 may be adjacent to tangible objects 304 and/or overlaid with tangible objects 304.

In FIG. 3, a user 106 is interacting with a concept module 114 called "saving and budgeting" and a scenario 116 called "making a budget" while sitting at a desk. In this example, the user 106 is working on a budgeting document 305 while employing the augmented reality user device 200. The augmented reality user device 200 presents a virtual object 306 that identifies the concept module 114 and scenario 116 the user 106 is executing. In this example, the scenario 116 comprises information identifying one or more challenges. For example, the scenario 116 identifies a challenge for the user 106 to create a budget. The augmented reality user device 200 presents information related to the challenge as a virtual object 308. The scenario 116 further comprises information identifying instructions related to the scenario 116 and/or challenges. The augmented reality user device 200 presents the instructions as a virtual object 310. In this example, the virtual object 310 may provide instructions about creating a budget and is overlaid with the budgeting document 305.

The augmented reality user device 200 identifies objects in front of the user 106 and actions being performed by the user 106. The augmented reality user device 200 determines whether actions being performed by the user 106 are related to the concept module 114 and scenario 116 the user 106 is executing. For example, the augmented reality user device 200 may identify text, gestures, and/or actions performed by the user 106 that correspond with the user 106 making a budget. The augmented reality user device 200 generates user action information 107 that comprises information identifying the concept module 114, scenario 116, and/or actions performed by the user 106 that are related to the concept module 114 and the scenario 116.

The augmented reality user device 200 generates a token 110 comprising a user identifier 103 for the user 106 and the user action information 107. The augmented reality user device 200 sends the token 110 to the remote server 102 to modify the virtual account information and/or account information for the user 106. For example, the augmented reality user device 200 generates the token 110 and sends the token 110 to the remote server 102 to update or credit the user's virtual account information based on the actions performed by the user 106. The user 106 may receive virtual credit for completing tasks or challenges specified by the concept module 114 and scenario 116.

In response to sending the token 110, the augmented reality user device 200 receives virtual assessment data 111 from the remote server 102. In one embodiment, the virtual assessment data 111 comprises the modified virtual account information, ranking information for the user 106 based on their virtual account information, and account information for the user 106. The augmented reality user device 200 presents the virtual account information as a virtual object 312. The virtual account information may indicate a current virtual account balance for the user 106. The augmented reality user device 200 presents the ranking information for the user 106 as a virtual object 314. The ranking information may indicate a rank for the user 106 compared to other users 106. The ranking may be based on the virtual account balance, the number of concept modules 114 and scenarios 116 completed, the number of challenges completed, any suitable other metric, or combination of metrics. The augmented reality user device 200 presents the account information for the user 106 as a virtual object 316. The account information comprises information about the user's 106 account (e.g. account balances), information about rewards or modifications to the user's 106 account information based on changes to the user's virtual account information, any other information, or combinations of information. For example, the account information may indicate that the user 106 has received a credit to one or more of the user's real accounts (e.g. bank accounts) based on the user 106 increasing their virtual account balance. In this example, the augmented reality user device 200 allows the user 106 to visualize changes to their virtual accounts and real accounts in real-time based on actions being performed by the user 106 in the real world.

FIG. 4 is a flowchart of an embodiment of an augmented reality overlaying method 400 for an augmented reality user device 200. Method 400 is employed by the processor 202 of the augmented reality user device 200 to generate a token 110 based on the user 106 of the augmented reality user device 200 and actions performed by the user 106 that are related to a concept module 114 or scenario 116 the user 106 is interacting with. The augmented reality user device 200 uses the token 110 to request information and/or to modify the user's 106 virtual account information and/or account information. The augmented reality user device 200 allows the user 106 to visualize the impact of various actions on their virtual account and/or account.

At step 402, the augmented reality user device 200 authenticates a user 106. The user 106 authenticates themselves by providing credentials (e.g. a log-in and password) or a biometric signal. The augmented reality user device 200 authenticates the user 106 based on the user's input. The user 106 is able to generate and send tokens 110 using the augmented reality user device 200 upon authenticating the user 106.

At step 404, the augmented reality user device 200 identifies a user identifier 103 for the user 106. Once the user 106 has been authenticated, the augmented reality user device 200 identifies the user 106 and a user identifier 103 for the user 106. The user identifier 103 may be used to identify and authenticate the user 106 in other systems, for example, third-party databases 130.

At step 406, the augmented reality user device 200 executes a scenario 116 for the user 106. In one embodiment, the augmented user device 200 communicates with the remote server 102 to access and execute a concept module 114 and scenario 116 for the user 106. For example, the user 106 provides an input to the augmented reality user device 200 to indicate the concept module 114 and/or scenario 116 the user 106 would like to execute. The augmented reality user device 200 exchanges messages with the remote server 102 to provide access or to download the concept module 114 and scenario 116 identified by the user 106.

In another embodiment, concept modules 114 and scenarios 116 are stored locally on the augmented reality user device 200 and the user 106 provides an input to the augmented reality user device 200 to indicate the concept module 114 and/or scenario 116 the user 106 would like to execute. The augmented reality user device 200 executes the concept module 114 and scenario 116 identified by the user 106.

At step 408, the augmented reality user device 200 analyzes the scene in front of the user 106. The augmented reality user device 200 performs text recognition and/or object recognition to identify tangible objects in the scene in front of the user 106. The augmented reality user device 200 identifies objects based on the size, shape, color, texture, material, and/or any other characteristics of an object.

At step 410, the augmented reality user device 200 identifies one or more user actions. The augmented reality user device 200 performs gesture recognition to identify actions and gestures being performed by the user 106. The augmented reality user device 200 determines how the user 106 is interacting with the identified objects in the scene in front of the user 106. In one embodiment, the augmented reality user device 200 compares the user's gestures and action with stored known user actions to classify the user's actions or to associate the user's actions with a known stored action.

At step 412, the augmented reality user device 200 determines whether the identified user actions are related to the scenario 116. For example, the scenario 116 may indicate specific user actions or a combination of user actions. For instance, the scenario 116 identifies a series of user actions that are used to complete a challenge. The augmented reality user device 200 compares the actions performed by the user 106 with the user actions identified by the scenario 116. The augmented reality user device 200 determines the actions performed by the user 106 are related to the scenario 116 when the actions substantially match, for example, when the actions are the same. The augmented reality user device 200 proceeds to step 414 when one or more of the identifies user actions are related to the scenario 116. Otherwise, the augmented reality user device 200 returns to step 408 to continue monitoring for user actions related to the scenario 116.

At step 414, the augmented reality user device 200 generates a token 110. In one embodiment, the augmented reality user device 200 generates a token 110 comprising the user identifier 103 and user actions information 107. The user action information 107 comprises information about the identified user actions related to the scenario 116, information about the concept module 114 or the scenario 116, any other information, or combinations of information. In other embodiments, the augmented reality user device 200 generates a token 110 comprising any other information. At step 416, the augmented reality user device 200 sends the token 110 to the remote server 102.

At step 418, the augmented reality user device 200 receives virtual assessment data 111 from the remote server 102 in response to sending the token 110 to the remote server 102. In one embodiment, the virtual assessment data 111 comprises updated virtual account information and/or account information for the user. In other embodiments, the virtual assessment data 111 comprises ranking information and/or any other information for the user 106.

At step 420, the augmented reality user device 200 presents the virtual assessment data 111 as virtual objects in the real scene in front of the user 106. The augmented reality user device 200 presents virtual account information, account information, ranking information, and any other information provided by the virtual assessment data 111 as virtual objects overlaid with tangible objects in the real scene in front of the user 106.

FIG. 5 is a flowchart of an embodiment of an augmented reality overlaying method 500 for a server 102. Method 500 is employed by the augmented reality engine 126 in the server 102 to provide information to a user 106 of an augmented reality user device 200 in response to receiving a token 110 from the augmented reality user device 200.

At step 502, the augmented reality engine 126 receives a token 110 from the augmented reality user device 200. The augmented reality engine 126 decrypts and/or decodes the token 110 when the token 110 is encrypted or encoded by the augmented reality user device 200. In one embodiment, the augmented reality engine 126 processes the token 110 to identify a user identifier 103 and user action information 107. In other embodiments, the augmented reality engine 126 processes the token 110 to identify any other information.

At step 504, the augmented reality engine 126 identifies account information for a user 106 based on the user identifier 103. For example, the augmented reality engine 126 uses the user identifier 103 to look-up the account information and accounts for the user 106 in the account information database 118.

At step 506, the augmented reality engine 126 identifies virtual account information for the user 106. In one embodiment, the augmented reality engine 126 identifies the virtual account information for the user 106 based on the user identifier 103. For example, the augmented reality engine 126 uses the user identifier 103 to look-up the virtual account information and accounts for the user 106 in the virtual account information database 120. In another embodiment, the augmented reality engine 126 identifies the virtual account information for the user 106 based on information provided by the account information for the user 106. For example, the account information comprises information identifying a virtual account for the user 106. In other embodiments, the augmented reality engine 126 identifies the virtual account information for the user 106 based on any other suitable information.

At step 508, the augmented reality engine 126 modifies the virtual account information based on the user account information 107. For example, the augmented reality engine 126 increases the virtual account balance when the user 106 performs actions that are identified as positively impacting the user's 106 virtual account such as completing a concept module 114, a scenario 116, or a challenge. As another example, the augmented reality engine 126 decreases the virtual account balance when the user 106 performs an action that is identified as negatively impacting the user's 106 virtual account balance. In other examples, the augmented reality engine 126 modifies the virtual account information based on any other suitable criteria.

At step 510, the augmented reality engine 126 determines if the user 106 qualifies for any rewards based on the balance of their virtual account. In one embodiment, the augmented reality engine 126 determines that the user 106 qualifies for a reward when the user's 106 virtual account balance exceeds a predetermined threshold value. In another embodiment, the augmented reality engine 126 determines that the user 106 qualifies for a reward when user's performs an action that substantially matches an action identified by a concept module 114 or scenario 116 that triggers the user 106 qualifying for a reward. For example, when the user's action correspond with the user 106 opening a new real account, the user 106 may automatically qualify for rewards or benefits for the new account. In other embodiments, the augmented reality engine 126 determines if the user 106 qualifies for any rewards based on any other suitable criteria.

At step 512, the augmented reality engine 126 proceeds to step 516 when the augmented reality engine 126 determines that the user 106 qualifies for a reward. Otherwise, the augmented reality engine 126 proceeds to step 514 when the user 106 does not qualify for any rewards.

At step 514, the augmented reality engine 126 generates virtual assessment data 111 comprising the modified virtual account information and proceeds to step 520. In some embodiments, the virtual assessment data 111 further comprise any other information for the user 106.

At step 516, the augmented reality engine 126 modifies the account information based on the qualified rewards. The augmented reality engine 126 modifies the user's 106 account information to reflect the qualified rewards. For example, the augmented reality engine 126 modifies the user's 106 account information to reflect account credits, discounted interest rates, new accounts, fee waivers, special offers, coupons, services, or any other types of rewards.

At step 518, the augmented reality engine 126 generates virtual assessment data 111 comprising the modified virtual account information and the modified account information. In some embodiments, the virtual assessment data 111 further comprise any other information for the user 106. At step 520, the augmented reality engine 126 sends the virtual assessment data 111 to the augmented reality user device 200.

FIGS. 6-8 provide examples of how the augmented reality system 100 may operate when a user 106 is visualizing information related to virtual forecasts 113 based on the user's projected account information. For example, the user 106 can use a virtual forecast 113 to visualize a future state of their account based on either their current behavior or different types of behavior. The following is another non-limiting example of how the augmented reality user system 100 may operate. The user 106 communicates with the forecasting engine 128 to generate virtual forecasts 113 to visualize a future state of their account based on their current behavior, to visualize a goal the user 106 would like to achieve, and/or to analyze what actions the user 106 can take to achieve their goals.

The user 106 authenticates themselves before using the augmented reality user device 200 by providing credentials (e.g. a log-in and password) and/or a biometric signal. The augmented reality user device 200 authenticates the user 106 based on the user's input and allows the user to generate and send tokens 110. The augmented reality user device 200 identifies the user 106 and a user identifier 103 for the user 106 upon authenticating the user 106. Once the user 106 has been authenticated, the user identifier 103 is used by other systems and devices (e.g. remote server 102 and/or a third-party database 130) to identify and authenticate the user 106 without requiring the user 106 to provide additional credentials for each system.

The augmented reality user device 200 generates a token 110 and sends the token 110 to the remote server 102. In one embodiment, the augmented reality user device 200 generates a token 110 comprising the user identifier 103 to request a virtual forecast 113 and/or a virtual demographic forecast 115 for the user 106. In another embodiment, the augmented reality user device 200 generates a token 110 comprising the user identifier 103 and a target profile 109 to request a virtual forecast 113 for the user 106 and/or virtual forecast analysis information 117. The requested virtual forecast 113 may be based on the user's 106 account information and/or the target profile 109. In other embodiments, the augmented reality user device 200 generates a token 110 comprising any other suitable information or combinations of information. The augmented reality user device 200 encrypts and/or encodes the token 110 prior to sending the token 110 to the remote server 102.

The server 102 receives the token 110 and processes the token 110 to identify the user identifier 103 and target profile 109 (if present). The server 102 decrypts or decodes the token 110 when the token 110 is encrypted or encoded by the augmented reality user device 200. The server 102 uses the user identifier 103 to look-up account information for the user 106 in the account information database 118. The server 102 generates virtual forecasts 113 based on the user's 106 account information and/or the target profile.

In one embodiment, the server 102 may also use the user's 106 account information to identify other people with similar demographic or account information to generate demographic information. The server 102 generates a virtual demographic forecast 115 based on the demographic information.

The server 102 generates virtual assessment data 111 comprising one or more virtual forecasts 113, a virtual demographic forecast 115, virtual forecast analysis information 117, any other information, or combinations of information. The server 102 sends the virtual assessment data 111 to the augmented reality user device 200.

The augmented reality user device 200 receives the virtual assessment data 111 and processes the virtual assessment data 111 to access the information provided by the server 102. The augmented reality user device 200 presents the received information as virtual objects overlaid with tangible objects in the real scene in front of the user 106. The user 106 may use the information presented by the augmented reality user device 200 to visualize the virtual forecast 113, the virtual demographic forecast 115, the virtual forecast analysis information 117, and/or any other information for the user 106. Visualizing the virtual forecast 113, the virtual demographic forecast 115, and/or the virtual forecast analysis information 117 provides a more intuitive representation of the raw data used to generate the virtual forecast 113, the virtual demographic forecast 115, and the virtual forecast analysis information 117. An example of the augmented reality user device 200 presenting information to the user 106 as virtual objects overlaid with tangible objects in a real scene in front of the user 106 is described in FIG. 6.

FIG. 6 is another embodiment of a first person view from a display 208 of an augmented reality user device 200 overlaying virtual objects 302 with tangible objects 304 within a real scene 600. In FIG. 6, a user 106 is visualizing a virtual forecast 113 based on the user's 106 account information and a virtual forecast 113 based on a target profile 109 for the user 106 overlaid with a real scene 600 in front of the user 106.

The augmented reality user device 200 receives inputs from the user 106 to generate a target profile 109. For example, the augmented reality user device 200 receives information for the target profile 109 from the user 106 as voice commands, gestures, interactions with a physical component (e.g. a button, knob, or slider) of the augmented reality user device 200, or via any other suitable technique or mechanism. In this example, the augmented reality user device 200 receives an input from the user 106 identifying target account balances for a particular time in the future. The augmented reality user device 200 generates a token 110 comprising a user identifier 103 for the user 106, the target profile 109, and any other suitable information. The augmented reality user device 200 sends the token 110 to the remote server 102 to request information related to a virtual forecast 113 based on the user's 106 account information, information related to a virtual forecast 113 based on the target profile 109, a virtual demographic forecast 115, and virtual forecast analysis information 117. In other embodiments, the augmented reality user device 200 may request any other combination of information.

In response to sending the token 110, the augmented reality user device 200 receives virtual assessment data 111 from the remote server 102. In this example, the virtual assessment data 111 comprises information related to a virtual forecast 113 based on the user's account information, information related to a virtual forecast 113 based on the target profile 109, a virtual demographic forecast 115, and virtual analysis information 117.

The augmented reality user device 200 presents the received information as virtual objects 302 overlaid with the real scene 600 in front of the user 106. In FIG. 6, the augmented reality user device 200 presents a virtual object 602 that indicates the left portion of the display 208 has information related to a virtual forecast 113 based on the user's 106 account information. For example, the virtual forecast 113 based on the user's 106 account information is used to present a type the house (shown as virtual object 604) and a type of car (shown as virtual object 606) the user 106 can afford in the future based on their current account information and current behavior.

In one embodiment, the augmented reality user device 200 presents virtual objects 604 and 606 may positioned and oriented appropriately within the context of the real scene in front of the user 106. For example, when a virtual object 302 represents a house, the augmented reality user device 200 positions the virtual object 302 adjacent to other houses in the real scene. As another example, when a virtual object 302 represents a house, the augmented reality user device 200 positions the virtual object 302 to hide an existing structure (e.g. a house). This allows the user 106 to better visualize the virtual object 302 in the context of the real world. Similarly, when a virtual object 302 represents a car, the augmented reality user device 200 positions and orients the virtual object 302 adjacent to other cars and/or positions the virtual object 302 to hide an existing vehicle. In other words, the augmented reality user device 200 positions and orients virtual objects 302 correctly within the real scene 600 in front of the user 106.

In one embodiment, the augmented reality user device 200 generates a virtual object 302 that covers the entire field of view of the user 106 to generate a virtual environment. One or more other virtual objects 302 may be overlaid with the virtual environment. For example, the augmented reality user device 200 generates a virtual object that allows the user 106 to visualize being in another location, for example, vacationing in another country or within a structure (e.g. a new home). The augmented reality user device 200 allows the user 106 to use information received from the server 102 to visually immerse themselves within a virtual reality.

In FIG. 6, the augmented reality user device 200 presents a virtual object 608 that indicates the right portion of the display 208 has information related to a virtual forecast 113 for the user 106 based on their target profile 109. In this example, the virtual forecast 113 based on the user's target profile 109 is used to present a type the house (shown as virtual object 610) and a type of car (shown as virtual object 612) the user 106 would like to afford in the future based on their target profile 109. In FIG. 6, the augmented reality user device 200 allows the user 106 to readily see any disparity between the virtual forecast 113 based on the user's account information and the virtual forecast 113 based on the user's target profile 109. Differences between the virtual forecast 113 based on the user's account information and the virtual forecast 113 based on the user's target profile 109 may indicate the user 106 is not on a path to achieve their goals and that the user 106 should adjust their current behavior and/or target profile 109. In this example, the user 106 can see that the virtual forecast 113 based on their target profile 109 is visualized as a lavish lifestyle while the virtual forecast 113 based on their actual account information results in a more modest lifestyle.

The augmented reality user device 200 presents virtual forecast analysis information 117 to the user 106 as a virtual object 618. The virtual forecast analysis information 117 comprises information about particular actions the user 106 can perform to improve their virtual forecast 113, information about the behavior and habits of other people who have achieved similar goals as the goals identified by the target profile 109, and/or any other information.

The augmented reality user device 111 presents a virtual object 614 that comprises virtual forecast information. The virtual forecast information comprises alphanumeric information about one or more virtual forecasts 113.

The augmented reality user device 200 presents a virtual object 616 that comprises virtual demographic information. The virtual demographic information comprises information related to other people that either previously or currently have similar types of accounts, account balances, spending habits based on their transaction history, and/or any other similar account information as the user 106.

In this example, the augmented reality user device 200 allows the user 106 to visualize the current path the user 106 according to the virtual forecast 113 based on the user's account information compared to their desired path according to the virtual forecast 113 based on their target profile 109. The augmented reality user device 200 also allows the user 106 to quickly identify information for achieving their goals.

FIG. 7 is a flowchart of an embodiment of an augmented reality overlaying method 700 for an augmented reality user device 200. Method 700 is employed by the processor 202 of the augmented reality user device 200 to generate a token 110 for requesting virtual forecasts 113 based on the user 106 of the augmented reality user device 200. The augmented reality user device 200 allows the user 106 to visualize raw data that represents projected outcomes for the user 106 based on the user's 106 account information and habits.

At step 702, the augmented reality user device 200 authenticates the user 106. The user 106 authenticates themselves by providing credentials (e.g. a log-in and password) or a biometric signal. The augmented reality user device 200 authenticates the user 106 based on the user's input. The user 106 is able to generate and send tokens 110 using the augmented reality user device 200 upon authenticating the user 106.

At step 704, the augmented reality user device 200 identifies a user identifier 103 for the user 106. Once the user 106 has been authenticated, the augmented reality user device 200 identifies the user 106 and a user identifier 103 for the user 106. The user identifier 103 may be used to identify and authenticate the user 106 in other systems, for example, third-party databases 130.

At step 706, the augmented reality user device 200 determines whether the user 106 has provided a target profile 109. The augmented reality user device 200 determines that it has received a target profile 109 when the augmented reality user device 200 receives information from the user 106 for a target profile 109. The augmented reality user device 200 may receive an information for the target profile 109 from the user 106 as voice commands, gestures, interactions with a button or user interface of the augmented reality user device 200, or via any other suitable technique or mechanism. The augmented reality user device 200 proceeds to step 708 when the user 106 has not provided a target profile 109. The augmented reality user device 200 proceeds to step 710 when the user 106 has provided a target profile 109.

At step 708, the augmented reality user device 200 generates a token 110. In one embodiment, the augmented reality user device 200 generates a token 110 comprising the user identifier 103. In other embodiments, the augmented reality user device 200 generates a token 110 further comprising any other information. At step 712, the augmented reality user device 200 sends the token 110 to the remote server 102.

At step 714, the augmented reality user device 200 receives virtual assessment data 111 from the remote server 102 in response to sending the token 110 to the remote server 102. In one embodiment, the virtual assessment data 111 comprises a virtual forecast 113 based on the user's 106 account information. In other embodiments, the virtual assessment data 111 further comprises any other information for the user 106.

At step 716, the augmented reality user device 200 presents information related to the virtual forecast 113 based on the user's 106 account information as a virtual object overlaid with the real scene in front of the user 106. The augmented reality user device 200 presents the virtual forecast 113 based on the user's 106 account information as virtual objects overlaid with tangible objects in the real scene in front of the user 106.

Returning to step 706, the augmented reality user device 200 proceeds to step 710 when the user 106 has provided a target profile 109. At step 710, the augmented reality user device 200 generates a token 110 comprising the user identifier 103 and the target profile 109. In other embodiments, the augmented reality user device 200 generates a token 110 further comprising any other information. At step 718, the augmented reality user device 200 sends the token 110 to the remote server 102.

At step 720, the augmented reality user device 200 receives virtual assessment data 111 comprising one or more virtual forecasts 113 and virtual forecast analysis information 117. The virtual forecasts 113 are based on the user's 106 account information and/or the target profile 109. In one embodiment the virtual assessment data 111 comprises a first virtual forecast 113 based on the user's account information and a second virtual forecast 113 based on the target profile 109. The virtual forecast analysis information 117 identifies actions the user 106 can take to realize goals defined by the target profile 109. In other embodiments, the virtual assessment data 111 further comprises any other information for the user 106.

At step 722, the augmented reality user device 200 presents information related to the virtual forecasts 113 and virtual forecast analysis information 117 as virtual objects overlaid with the real scene in front of the user 106. The augmented reality user device 200 presents the virtual forecasts 113 and virtual forecast analysis information 117 as virtual objects overlaid with tangible objects in the real scene in front of the user 106.

At step 724, the augmented reality user device 200 determines whether the virtual assessment data 111 comprises a virtual demographic forecast 115. In one embodiment, the augmented reality user device 200 determines that the virtual assessment data 111 comprises a virtual demographic forecast 115 based on the presence of the virtual demographic forecast 115 in the virtual assessment data 111. In other embodiments, the augmented reality user device 200 determines that the virtual assessment data 111 comprises a virtual demographic forecast 115 based on any other indicators and/or using any other technique.

At step 726, the augmented reality user device 200 presents information related to the virtual demographic forecast 115 as a virtual object overlaid with the real scene in front of the user 106. The augmented reality user device 200 presents the virtual demographic forecast 115 as virtual objects overlaid with tangible objects in the real scene in front of the user 106.

FIG. 8 is a flowchart of another embodiment of an augmented reality overlaying method 800 for a server 102. Method 800 is employed by the forecasting engine 128 in the server 102 to provide the user 106 with information related to virtual forecasts 113 in response to receiving a token 110 from the augmented reality user device 200.

At step 802, the forecasting engine 128 receives a token 110 from the augmented reality user device 200. The forecasting engine 128 decrypts and/or decodes the token 110 when the token 110 is encrypted or encoded by the augmented reality user device 200. In one embodiment, the forecasting engine 128 processes the token 110 to identify a user identifier 103. In other embodiments, the forecasting engine 128 processes the token 100 to identify any other information.

At step 804, the forecasting engine 128 identifies account information for a user 106 based on the user identifier 103. For example, the forecasting engine 128 uses the user identifier 103 to look-up the account information and accounts for the user 106 in the account information database 118.

At step 806, the forecasting engine 128 identifies demographic information based on the user's 106 account information. For example, the forecasting engine 128 may query the account information database 118 for other people with similar account information. For example, the forecasting engine 128 may identify other people that either previously or currently have similar types of accounts, account balances, and/or spending habits based on their transaction history. In some embodiments, step 806 may be optional and omitted.

At step 808, the forecasting engine 128 determines whether the token 110 comprises a target profile 109. In one embodiment, the forecasting engine 128 determines that the token 110 comprises a target profile 109 based on the presence of the target profile 109 in the token 110. In other embodiments, the forecasting engine 128 determines that the token 110 comprises a target profile 109 based on any other indicators and/or using any other technique. The forecasting engine 128 proceeds to step 810 when the forecasting engine 128 determines the token 110 does not comprise a target profile 109. The forecasting engine 128 proceeds to step 812 when the forecasting engine 128 determines the token 110 comprises a target profile 109.

At step 810, the forecasting engine 128 generates a virtual forecast 113 for the user 106 based on their account information. In one embodiment, the forecasting engine 128 generates the virtual forecast 113 based on projected account balances and transaction history for the user 106. In other embodiments, the forecasting engine 128 generates the virtual forecast 113 based on any other information from the user's 106 account information.

At step 814, the forecasting engine 128 generates a virtual demographic forecast 115 based on the demographic information. In one embodiment, the forecasting engine 128 generates the virtual demographic forecast 115 based on account information from the other people. For example, the forecasting engine 128 generates the virtual demographic forecast 115 based on projected account balances and transaction history for the other identified people. In other embodiments, the forecasting engine 128 generates the virtual demographic forecast 115 based on any other information.

At step 816, the forecasting engine 128 generates virtual assessment data 111 comprising the virtual forecast 113 and the virtual demographic forecast 115. In some embodiments, the virtual assessment data 111 further comprises any other information for the user 106.

Returning to step 808, the forecasting engine 128 proceeds to step 812 when the forecasting engine 128 determines the token 110 comprises a target profile 109. At step 812, the forecasting engine 128 generates a first virtual forecast 113 based on the user's 106 account information. In one embodiment, the forecasting engine 128 generates the first virtual forecast 113 similar to as described in step 810.

At step 818, the forecasting engine 128 generates a second virtual forecast 113 based on the target profile 109. In one embodiment, the forecasting engine 128 generates the second virtual forecast 113 based on the information provided by the target profile 109. For example, the target profile 109 may identify target account balances and/or any other goals for the user 106.

At step 820, the forecasting engine 128 compares information for the first virtual forecast 113 to information for the second virtual forecast 113. The forecasting engine 128 may identify any differences between the first virtual forecast 113 and the second virtual forecast 113. For example, the forecasting engine 128 identifies account balance differences, projected lifestyle differences, and/or any other difference between the first virtual forecast 113 and the second virtual forecast 113.

At step 822, the forecasting engine 128 generates virtual forecast analysis information 117 based on the comparison. In one embodiment, the forecasting engine 128 identifies differences between the first virtual forecast 113 and the second virtual forecast 113. In another embodiment, the forecasting engine 128 identifies one or more actions the user 106 can perform to reduce or minimize differences between the first virtual forecast 113 and the second virtual forecast 113. For example, the virtual forecast analysis information 117 identifies an amount the user 106 should invest or save or reoccurring expenses the user 106 should avoid. In other examples, the virtual forecast analysis information 117 identifies any other actions or behavior for the user 106.

At step 824, the forecasting engine 128 generates virtual assessment data 111 comprising the first virtual forecast 113, the second virtual forecast 113, and the virtual forecast analysis information 117. In some embodiments, the virtual assessment data 111 further comprises any other information for the user 106. At step 826, the forecasting engine 128 sends the virtual assessment data 111 to the augmented reality user device 200.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An augmented reality system comprising:
an augmented reality user device for a user comprising:
  a display configured to overlay virtual objects onto tangible objects in a real scene in real-time;
  a memory operable to store a plurality of scenarios linked with a virtual account for the user, wherein each scenario is linked with one or more challenges that affect the virtual account;
  one or more processors operably coupled to the display and the memory, and configured to implement:
    a virtual assessment engine configured to:
      identify a user identifier for the user in response to authenticating the user;
      receive an input from the user identifying a scenario from among the plurality of scenarios;
      execute the scenario for the user, wherein executing the scenario identifies one or more challenges linked with the scenario;
      identify one or more user actions;
      determine whether the user actions are related to a challenge linked with the scenario;
      generate user action information identifying the user actions and the scenario when the user actions are related to the scenario;
      generate a token comprising:
        the user identifier, and
        the user action information;
      send the token to a remote server;
      receive virtual assessment data in response to sending the token to the remote server, wherein the virtual assessment data comprises:
        virtual account information for the user comprising a virtual account balance linked with the plurality of scenarios, and
        account information for the user; and
    a virtual overlay engine configured to present the virtual account information and the account information as virtual objects overlaid with the real scene; and
  the remote server comprising an augmented reality engine configured to:
    identify the account information for the user based on the user identifier;
    identify virtual account information for the user based on the user identifier;
    modify the virtual account information based on the user action information;
    generate the virtual assessment data comprising the modified virtual account information and the account information for the user; and
    send the virtual assessment data to the augmented reality user device.

2. The system of claim 1, wherein the augmented reality engine is configured to:
  determine whether the user qualifies for a reward based on the modified virtual account information; and
  modify the account information according to the reward when the user qualifies for the reward, and
  wherein the virtual assessment data comprises the modified account information.

3. The system of claim 1, wherein the augmented reality engine is configured to:
  determine whether to modify the account information for the user based on the virtual account balance of the modified virtual account information; and
  modify the account information for the user when the balance of the modified virtual account information meets a predetermined threshold value, and
  wherein the virtual assessment data comprises the modified account information.

4. The system of claim 1, wherein the augmented reality engine is configured to:
  compare the virtual account information for the user to virtual account information for one or more other people;
  compare the account information for the user to account information for one or more other people;
  determine ranking information for the user based on the comparison of the virtual account information and the comparison of the account information; and
  wherein the virtual assessment data comprises the ranking information.

5. The system of claim 1, wherein the scenario comprises a task identifying a series of user actions; and
  determining whether the user actions are related to the scenario comprises:
  comparing the identified one or more user actions with the series of actions identified by the task; and
  determining the user actions are related to the scenario when the identified one or more user actions match the series of actions identified by the task.

6. The system of claim 1, wherein:
the augmented reality user device comprises a global position sensor configured to provide the geographic location of the user; and
the user action information comprises information identifying the geographic location of the user when performing the identified one or more user actions.

7. The system of claim 1, wherein identifying the one or more user actions comprises:
performing object recognition to identify an object in the real scene; and
performing gesture recognition to identify a user action with the identified object.

8. The system of claim 1, wherein the virtual overlay engine configured to present information related to the scenario as virtual objects overlaid with the real scene.

9. An augmented reality overlaying method comprising:
identifying, by a virtual assessment engine, a user identifier for a user in response to authenticating the user;
receiving, by the virtual assessment engine, an input from the user identifying a scenario from among a plurality of scenarios, wherein:
the plurality of scenarios is linked with a virtual account for the user; and
each scenario is linked with one or more challenges that affect the virtual account;
executing, by the virtual assessment engine, the scenario for the user, wherein executing the scenario identifies one or more challenges linked with the scenario;
identifying, by the virtual assessment engine, one or more user actions;
determining, by the virtual assessment engine, whether the user actions are related to a challenge linked with the scenario;
generating, by the virtual assessment engine, user action information identifying the user actions and the scenario when the user actions are related to the scenario;
generating, by the virtual assessment engine, a token comprising the user identifier and the user action information;
sending, by the virtual assessment engine, the token to a remote server;
identifying, by an augmented reality engine of the remote server, account information for the user based on the user identifier;
identifying, by the augmented reality engine, virtual account information for the user based on the user identifier, wherein the virtual account information comprises a virtual account balance linked with the plurality of scenarios;
modifying, by the augmented reality engine, the virtual account information based on the user action information;
generating, by the augmented reality engine, virtual assessment data comprising the modified virtual account information and the account information for the user; and
sending, by the augmented reality engine, the virtual assessment data to the augmented reality user device; and
presenting, by a virtual overlay engine, the virtual account information and the account information as virtual objects overlaid with the real scene.

10. The method of claim 9, further comprising:
determining, by the augmented reality engine, whether the user qualifies for a reward based on the modified virtual account information; and
modifying, by the augmented reality engine, the account information according to the reward when the user qualifies for the reward, and
wherein the virtual assessment data comprises the modified account information.

11. The method of claim 9, further comprising:
determining, by the augmented reality engine, whether to modify the account information for the user based on the virtual account balance of the modified virtual account information; and
modifying, by the augmented reality engine, the account information for the user when the balance of the modified virtual account information meets a predetermined threshold value, and
wherein the virtual assessment data comprises the modified account information.

12. The method of claim 9, further comprising:
comparing, by the augmented reality engine, the virtual account information for the user to virtual account information for one or more other people;
comparing, by the augmented reality engine, the account information for the user to account information for one or more other people; and
determining, by the augmented reality engine, ranking information for the user based on the comparison of the virtual account information and the comparison of the account information; and
wherein the virtual assessment data comprises the ranking information.

13. The method of claim 9, wherein the scenario comprises a task identifying a series of user actions; and
determining whether the user actions are related to the scenario comprises:
comparing the identified one or more user actions with the series of actions identified by the task; and
determining the user actions are related to the scenario when the identified one or more user actions match the series of actions identified by the task.

14. The method of claim 9, wherein the user action information comprises information identifying a geographic location of the user when performing the identified one or more user actions.

15. The method of claim 9, wherein identifying the one or more user actions comprises:
performing object recognition to identify an object in the real scene; and
performing gesture recognition to identify a user action with the identified object.

16. The method of claim 9, further comprising presenting, by the virtual overlay engine, information related to the scenario as virtual objects overlaid with the real scene.

17. An augmented reality user device comprising:
a display configured to overlay virtual objects onto tangible objects in a real scene in real-time;
a memory operable to store a plurality of scenarios linked with a virtual account for a user, wherein each scenario is linked with one or more challenges that affect the virtual account;
one or more processors operably coupled to the display and the memory, and configured to implement:
a virtual assessment engine configured to:
identify a user identifier for the user in response to authenticating the user;
receive an input from the user identifying a scenario from among the plurality of scenarios;

execute the scenario for the user, wherein executing the scenario identifies one or more challenges linked with the scenario;
identify one or more user actions;
determine whether the user actions are related to a challenge linked with the scenario;
generate user action information identifying the user actions and the scenario when the user actions are related to the scenario;
generate a token comprising:
the user identifier, and
the user action information;
send the token to a remote server;
receive virtual assessment data in response to sending the token to the remote server, wherein the virtual assessment data comprises:
virtual account information for the user comprising a virtual account balance linked with the plurality of scenarios, and
account information for the user; and
a virtual overlay engine configured to present the virtual account information and the account information as virtual objects overlaid with the real scene.

18. The device of claim 17, wherein the scenario comprises a task identifying a series of user actions; and
determining whether the user actions are related to the scenario comprises:
comparing the identified one or more user actions with the series of actions identified by the task; and
determining the user actions are related to the scenario when the identified one or more user actions match the series of actions identified by the task.

19. The device of claim 17, wherein:
the augmented reality user device comprises a global position sensor configured to provide the geographic location of the user; and
the user action information comprises information identifying the geographic location of the user when performing the identified one or more user actions.

20. The device of claim 17, wherein identifying the one or more user actions comprises:
performing object recognition to identify an object in the real scene; and
performing gesture recognition to identify a user action with the identified object.

* * * * *